(12) United States Patent
Oh

(10) Patent No.: US 12,370,902 B2
(45) Date of Patent: Jul. 29, 2025

(54) METHOD OF IMPLEMENTING VIRTUAL JET PROPULSION MODE IN ELECTRIC VEHICLE

(71) Applicants: Hyundai Motor Company, Seoul (KR); Kia Corporation, Seoul (KR)

(72) Inventor: Ji Won Oh, Hwaseong-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 196 days.

(21) Appl. No.: 18/367,399

(22) Filed: Sep. 12, 2023

(65) Prior Publication Data

US 2024/0399884 A1  Dec. 5, 2024

(30) Foreign Application Priority Data

May 31, 2023  (KR) .................... 10-2023-0069819

(51) Int. Cl.
    *B60L 15/20*      (2006.01)
(52) U.S. Cl.
    CPC ......... *B60L 15/20* (2013.01); *B60L 2240/421* (2013.01); *B60L 2240/423* (2013.01); *B60L 2250/26* (2013.01); *B60L 2260/26* (2013.01)
(58) Field of Classification Search
    None
    See application file for complete search history.

(56) References Cited

U.S. PATENT DOCUMENTS

| 11,707,987 | B1* | 7/2023 | Nair ................. G06Q 50/04 701/22 |
| 11,813,981 | B2* | 11/2023 | Vangelov ........... B60W 10/101 |
| 2019/0243362 | A1 | 8/2019 | Hyuga et al. |
| 2023/0322094 | A1* | 10/2023 | van Nus ............. B60L 15/20 701/22 |
| 2024/0166057 | A1* | 5/2024 | Isami ................ B60K 26/02 |

FOREIGN PATENT DOCUMENTS

| JP | 2019-151215 A | 9/2019 |
| JP | 6760770 B | 9/2020 |
| KR | 10-1547938 B | 8/2015 |
| KR | 10-1725673 B | 4/2017 |
| KR | 2022-0067067 A | 5/2022 |

* cited by examiner

*Primary Examiner* — Todd Melton
(74) *Attorney, Agent, or Firm* — Morgan, Lewis & Bockius LLP

(57) ABSTRACT

A method of implementing a virtual jet propulsion mode in an electric vehicle, includes collecting, by a controller of the vehicle, vehicle driving information while the vehicle is running in a state where the virtual jet propulsion mode including a plurality of virtual modes for mimicking an operating state and a driving feeling of a jet engine is set in the controller of the vehicle, selecting, by the controller, a virtual mode corresponding to a current vehicle driving state from among the virtual modes of the virtual jet propulsion mode based on the collected vehicle driving information, determining, by the controller, a motor torque command corresponding to the collected vehicle driving information and a currently selected virtual mode, and controlling, by the controller, an operation of a motor that drives the vehicle according to the motor torque command.

20 Claims, 11 Drawing Sheets

METHOD OF IMPLEMENTING VIRTUAL JET PROPULSION MODE IN ELECTRIC VEHICLE

CROSS-REFERENCE TO RELATED APPLICATION

The present application claims priority to Korean Patent Application No. 10-2023-0069819 filed on May 31, 2023, the entire contents of which is incorporated herein for all purposes by this reference.

BACKGROUND OF THE PRESENT DISCLOSURE

Field of the Present Disclosure

The present disclosure relates to a method of implementing a virtual jet propulsion mode capable of generating and providing a virtual driving feeling which is not easily felt in an electric vehicle so that a driver can experience differentiated driving sensibility and various driving pleasures.

Description of Related Art

An electric vehicle (EV) refers to a vehicle that runs using an electric motor. A drive system of the electric vehicle includes a battery that supplies power to drive a motor, an inverter which is connected to the battery to drive and control the motor, the motor as a vehicle driving source which is connected to the battery through the inverter to be charged and discharged, and a speed reducer that reduces a rotation speed of the motor and transmits the result to drive wheels.

Here, the inverter converts, in driving the motor, a direct current (DC) supplied from the battery into an alternating current (AC) and applies the alternating current to the motor through a power cable, converts, in recovering energy from the motor, the alternating current generated from the motor into the direct current and supplies the direct current to the battery to be charged.

Unlike a conventional internal combustion engine vehicle, a typical electric vehicle does not use a multi-stage transmission, and instead, has a configuration in which a speed reducer having a fixed gear ratio is disposed between a motor and driving wheels.

This is because, while an internal combustion engine has a wide distribution range of energy efficiency depending on operating points and can provide high torque only in a high-speed region, a motor has a relatively small difference in efficiency depending on operating points and can provide high torque at a low speed only by characteristics of the motor itself.

Furthermore, in a drive system of the conventional internal combustion engine vehicle, an oscillation mechanism such as a torque converter or a clutch is necessary due to characteristics of the internal combustion engine incapable of providing low speed driving, but in a drive system of the electric vehicle, such an oscillation mechanism is not necessary as the motor has characteristics that allow easy low-speed driving.

Due to these mechanical differences, the electric vehicle may provide smooth driving characteristics without interruption due to gear change, unlike the internal combustion engine vehicle. As described above, the drive system of the electric vehicle generates power by driving the motor with power of a battery, instead of generating power by combusting fuel as in the conventional internal combustion engine vehicle.

Accordingly, unlike torque of the internal combustion engine generated by aerodynamic and thermodynamic reactions, torque of the electric vehicle is generally more sophisticated, smoother, and more responsive compared with torque of the internal combustion engine.

These characteristics serve as positives in the electric vehicle, but in a case where the driver hopes to drive the vehicle for fun, these positives may feel banal. In the case of high-performance vehicles, various effects such as noise or physical vibration in running may be considered emotionally important.

Recently, as the use of electric vehicles increases, drivers who want to enjoy vibration, sound, thrill, and fun of driving in electric vehicles as in the internal combustion engine vehicle are increasing.

Accordingly, in the electric vehicle, there is a demand for a technique capable of generating and providing a virtual running sound that mimics a sound generated from a drive system other than the drive system of the electric vehicle.

It is desirable to provide a virtual driving realization function that allows a driver to experience desired driving sensibility, fun, thrill, and virtual acceleration/deceleration sound in the driver's vehicle without changing the vehicle, in terms of improvement of marketability and differentiation of the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of allowing a driver to experience differentiated driving sensibility and various driving pleasures in an electric vehicle.

The present disclosure is directed to providing a method of implementing virtual driving configured for enhancing marketability and differentiation of a vehicle by generating and providing a virtual driving feeling that a driver could not experience in a vehicle.

Various aspects of the present disclosure are directed to providing a method of implementing a virtual jet propulsion mode in an electric vehicle, the method including collecting, by a controller of the vehicle, vehicle driving information while the vehicle is running in a state where the virtual jet propulsion mode including a plurality of virtual modes for simulating an operating state and a driving feeling of a jet engine is set in the controller of the vehicle, selecting, by the controller, a virtual mode corresponding to a current vehicle driving state from among the virtual modes of the virtual jet propulsion mode based on the collected vehicle driving information, determining, by the controller, a motor torque command corresponding to the collected vehicle driving information and a currently selected virtual mode, and controlling, by the controller, an operation of a motor that drives the vehicle according to the motor torque command.

Other aspects and exemplary embodiments of the present disclosure are discussed infra.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
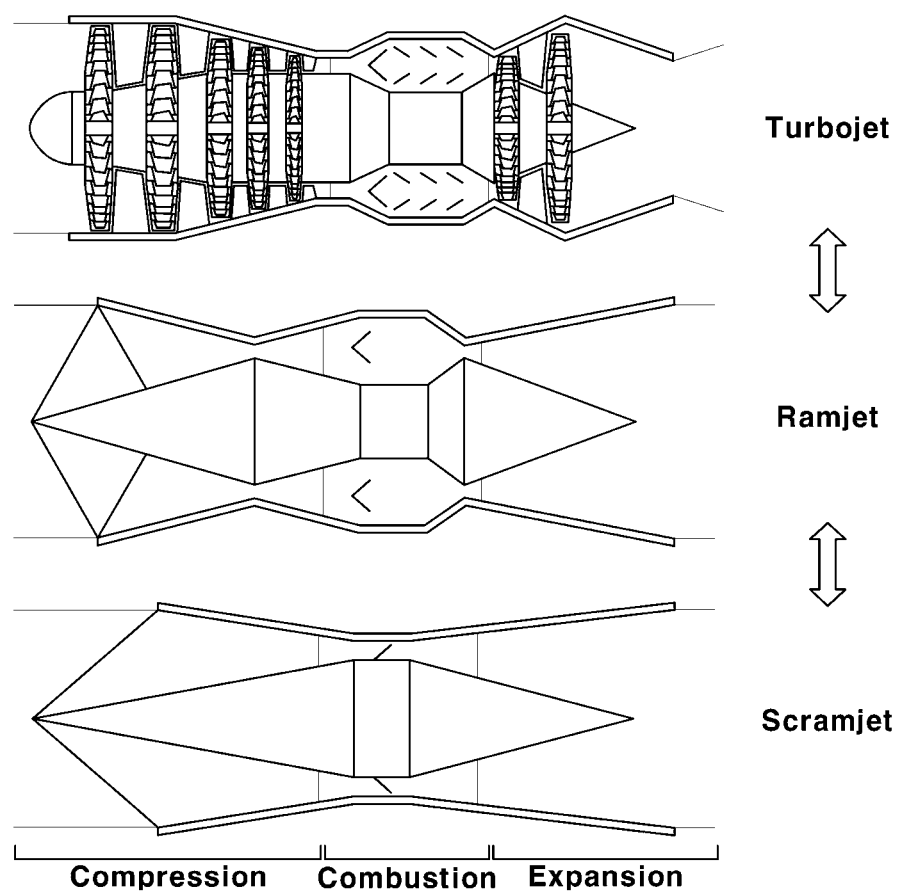
FIG. 1 is a diagram for illustrating a jet engine considered in an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Hereinafter, reference will be made in detail to various embodiments of the present disclosure, examples of which are illustrated in the accompanying drawings and described below. While the present disclosure will be described in conjunction with exemplary embodiments of the present disclosure, it will be understood that the present description is not intended to limit the present disclosure to the exemplary embodiments of the present disclosure. On the other hand, the present disclosure is directed to cover not only the exemplary embodiments of the present disclosure, but also various alternatives, modifications, equivalents and other embodiments, which may be included within the spirit and scope of the present disclosure as defined by the appended claims.

It will be understood that although the terms "first", "second", etc. may be used herein to describe various elements, these elements should not be limited by these terms. These terms are only used to distinguish one element from another. For example, a first element may be termed a second element, and similarly, a second element may be termed a first element, without departing from the scope of the exemplary embodiments of the present disclosure.

Furthermore, it will be understood that, when an element is "connected" or "coupled" to another element, it may be directly connected or coupled to the other element, or may be indirectly connected or coupled to the other element with a different element being interposed therebetween. In contrast, when an element is "directly connected" or "directly coupled" to another element, it means that there is no intervening element therebetween. Other words used to describe the relationship between elements should be interpreted in a similar manner (for example, "between" and "directly between", "adjacent" and "directly adjacent", etc.).

Wherever possible, the same reference numbers will be used throughout the drawings to refer to the same or like parts. The terminology used herein is for describing various exemplary embodiments only and is not intended to limit exemplary embodiments of the present disclosure. As used herein, the singular forms "a", "an", and "the" are intended to include the plural forms as well, unless the context clearly indicates otherwise. It will be further understood that the terms "comprise", "include", and "have" used herein specify the presence of stated components, steps, operations, and/or elements, but do not preclude the presence or addition of one or more other components, steps, operations, and/or elements.

As the use of electric vehicles has recently increased, there appear drivers who want to enjoy the same vibration, sound, thrill, and driving fun as in other drive systems such as internal combustion engine drive systems, or other modes of transport.

Accordingly, there is a demand for a technology capable of generating and providing virtual running vibration and running sound in an electric vehicle that mimics vibration and sound generated in a drive system other than a drive system of an electric vehicle or other modes of transport.

Various embodiments of the present disclosure relates to a method of realizing a virtual driving mode in which a driver of an electric vehicle can experience new driving sensibility and driving fun by generating and providing a new virtual driving feeling and sound that have not been felt in an electric vehicle.

Various embodiments of the present disclosure relates to a method of realizing a virtual driving mode in which a driver of an electric vehicle can experience various and maximized driving fun and differentiated driving sensibility in the driver's vehicle without changing vehicles.

In an exemplary embodiment of the present disclosure, a virtual jet propulsion mode is implemented and provided in an electric vehicle as a virtual driving mode in which a driver can experience new driving sensibility, fun, thrill, virtual vibration, and acceleration/deceleration sound.

Recently, in electric vehicles, methods of generating and providing virtual engine sound or virtual afterburner noise, or introducing virtual gear shifting (VGS) to generate and provide a virtual gear shifting feeling to display a virtual engine speed (virtual rpm) or the like related to the virtual gear shifting via a cluster have been provided.

Such methods for realizing virtual driving in the electric vehicles include an era-regressive background for virtually expressing emotion in internal combustion engine vehicles, but the present disclosure aims to provide new driving sensibility other than the emotional experience of internal combustion engine vehicles.

Considering that an electric vehicle has fast and accurate motor response performance due to characteristics of a drive system and a method of implementing mobility characteristics other than an internal combustion engine vehicle in the electric vehicle may be sufficiently attractive, the present disclosure aims to generate an effect that mimics driving sensibility of a jet engine, instead of a drive system of the internal combustion engine vehicle.

To the present end, various aspects of the present disclosure are directed to providing a technique capable of generating virtual effects that closely mimic emotions and feelings which may be experienced when various types of jet engines are operated in an electric vehicle through a virtual driving mode which is a jet propulsion mode and providing the generated virtual effects to a driver.

Here, the virtual effects may include virtual vibration and virtual sound that mimic characteristics of various types of jet engines, in which the virtual vibration may be provided by a motor which is a drive device that drives the vehicle, and the virtual sound may be provided by a sound system provided in the vehicle.

Hereinafter, a method of implementing a jet propulsion mode according to exemplary embodiments of the present disclosure will be described in detail with reference to the drawings.

FIG. 1 is a diagram for illustrating a jet engine considered in an exemplary embodiment of the present disclosure, which schematically shows a turbojet engine, a ramjet engine, and a scramjet engine.

Because operating mechanisms, configurations, and operation states of the actual turbojet engine, ramjet engine, and scramjet engine are already known, detailed descriptions of the jet engines will be omitted herein.

As shown in FIG. 1, jet engines to be mimicked in exemplary embodiments of the present disclosure include a turbojet engine, a ramjet engine, and a scramjet engine. These jet engines commonly include a compression region, a combustion region, and an expansion region. Here, the turbojet engine may include a turbofan and an afterburner.

In the turbojet engine, the ramjet engine, and the scramjet engine, a mechanism or method of generating propulsion necessary for flight by supplying fuel to air which is drawn and compressed at high speed to cause combustion and expansion is already known.

Figure 2:
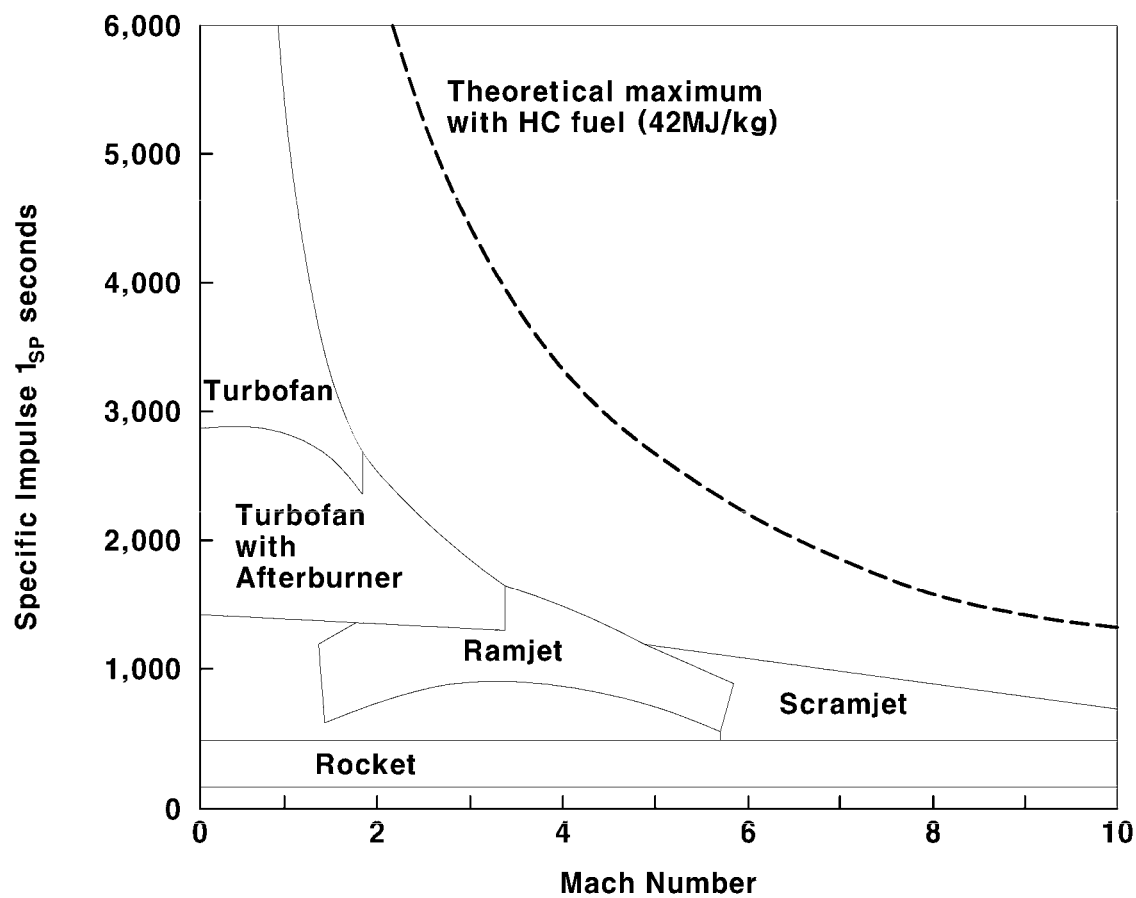
FIG. 2 is a diagram showing a comparison of propulsion performances of various jet engines to be implemented in a virtual jet propulsion mode in an exemplary embodiment of the present disclosure.

FIG. 2 is a diagram showing a comparison of propulsion performances of various jet engines to be mimicked and to be implemented as a virtual jet propulsion mode in an exemplary embodiment of the present disclosure, in which Mach Number and Specific Impulse of the turbojet engine, the ramjet engine, and the scramjet engine are shown.

As shown in FIG. 2, performances and operating characteristics are all different depending on the types of the jet engines, that is, the turbojet engine, the ramjet engine, and the scramjet engine, and accordingly, differentiated virtual effects may be implemented and provided according to the jet engines in consideration of the different performances and characteristics. In the exemplary embodiments of the present disclosure, the virtual effects may include virtual vibration and virtual sound that mimic jet engines.

In the exemplary embodiments of the present disclosure, the virtual jet propulsion mode includes a plurality of virtual modes implemented to mimic operating states of various types of jet engines in an electric vehicle. For example, the virtual jet propulsion mode may include a turbojet mode, a ramjet mode, and a scramjet mode that mimic the operating states of the turbojet engine, the ramjet engine, and the scramjet engine, respectively. In the present way, the plurality of virtual modes may be referred to as a plurality of modes classified according to the types of the jet engines.

In the exemplary embodiments of the present disclosure, in a case where one of the plurality of virtual modes included in the virtual jet propulsion mode is selected and executed, vehicle driving torque control, and sound and vibration effects are associated with each other in the electric vehicle to generate virtual effects that mimic an operating state of a jet engine corresponding to the selected virtual mode.

Furthermore, in the exemplary embodiments of the present disclosure, it is possible to perform shifting between virtual modes of the virtual jet propulsion mode based on information indicating a vehicle driving state, that is, vehicle driving information (driving state variable information), to generate a motor torque command configured for providing a mode shifting effect during the virtual mode shifting, to display visual information to be associated therewith on a display device such as a vehicle cluster, and to perform sound generation for outputting virtual sound through a sound system. In the exemplary embodiments of the present disclosure, the virtual sound output through the sound system may be referred to as a sound that mimics an operating state of a jet engine in a currently selected virtual mode.

Figure 3:
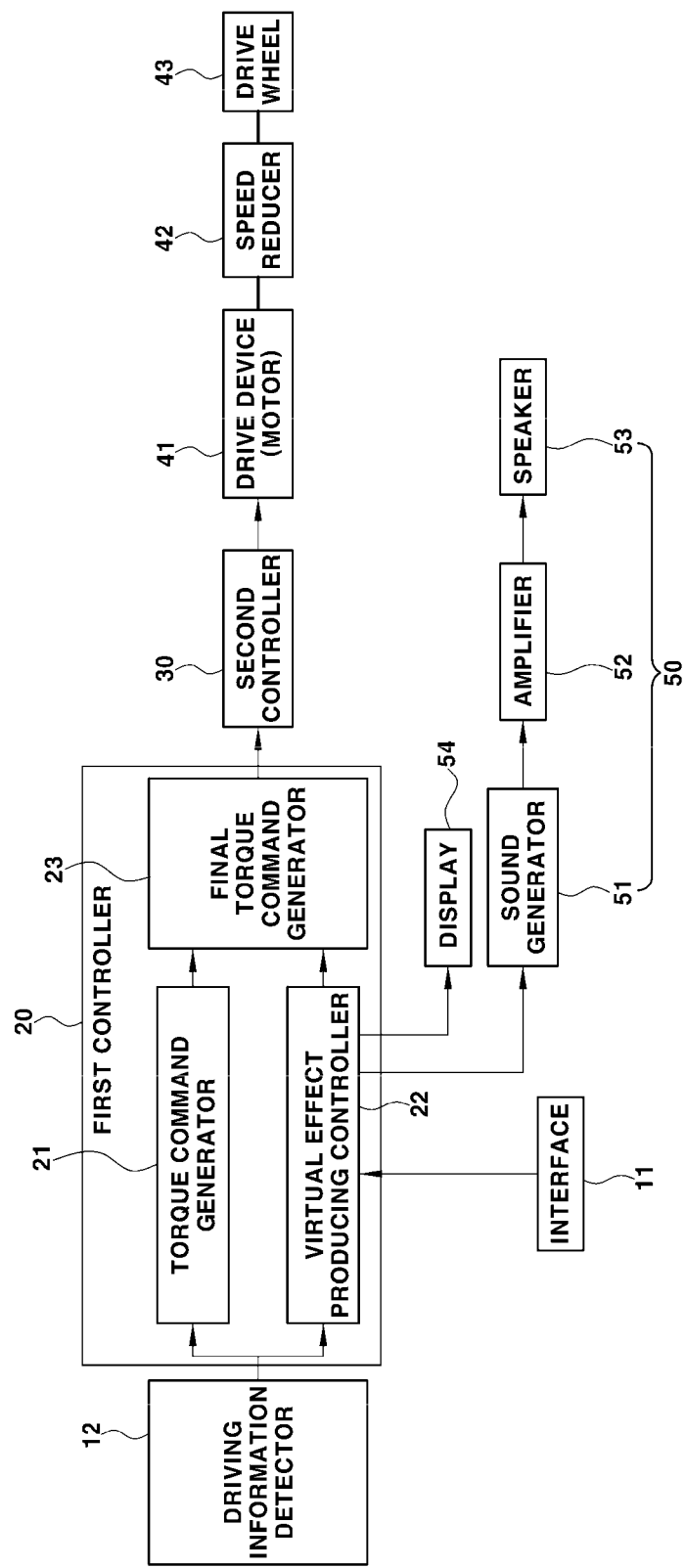
FIG. 3 is a block diagram showing a configuration of an apparatus for implementing a virtual jet propulsion mode according to various exemplary embodiments of the present disclosure.

FIG. 3 is a block diagram showing a configuration of an apparatus for implementing a virtual jet propulsion mode according to various exemplary embodiments of the present disclosure, which will be described.

As shown in FIG. 3, the apparatus for implementing the virtual jet propulsion mode in an electric vehicle is mounted in the vehicle to generate and provide a driving feeling of a virtual jet engine, and includes a driving information detector 12 which is configured to detect vehicle driving information, a first controller 20 that generates and outputs a torque command based on the vehicle driving information detected by the information detector 12, and a second controller 30 that is configured to control an operation of a motor, which is a drive device 41, according to the torque command output by the first controller 20.

The driving information detector 12 is a component that is configured to determine a motor torque command in the vehicle and detects vehicle driving information necessary for performing a function of a virtual jet propulsion mode (a virtual jet engine driving feeling realization function). Here, the vehicle driving information refers to information representing a current vehicle driving state and a driving state variable, which may include driver's driving input information and vehicle state information.

In various exemplary embodiments of the present disclosure, the driving information detector 12 may include an accelerator position detector which is configured to detect accelerator position input information according to driver's accelerator manipulation. The accelerator position detector may be a general accelerator position sensor (APS) which is mounted on an accelerator and outputs an electrical signal according to a driver's accelerator manipulation state.

Accordingly, the driver's driving input information includes an accelerator position input value (APS value) detected by the accelerator position detector as a driving input value according to the driver's accelerator manipulation.

Furthermore, the driving information detector 12 may further include a speed detector which is configured to detect a speed of a drive system of the vehicle. Accordingly, the vehicle state information includes the speed of the vehicle drive system detected by the speed detector. Here, the speed of the drive system of the vehicle may be a rotation speed of the motor which is the drive device 41 (motor speed) or a rotation speed of a drive wheel 43 (wheel speed). In the instant case, the speed detector may be a resolver mounted in the motor or a wheel speed sensor mounted in the drive wheel 43.

Furthermore, in the exemplary embodiment of the present disclosure, the vehicle driving information detected by the driving information detector 12 may further include a vehicle speed, and a sensor of the driving information detector 12 for detecting the vehicle speed may be a wheel speed sensor. A method of obtaining the vehicle speed from a signal of the wheel speed sensor is well known to those skilled in the art.

In the exemplary embodiment of the present disclosure, the vehicle driving information detected by the driving information detector 12 is input to a torque command generator 21 and a virtual effect producing controller 22 of the first controller 20 to be used to perform a control process of the virtual jet propulsion mode.

In the configuration of the apparatus shown in FIG. 1, the first controller 20 is configured to determine, generates, and outputs a motor torque command based on real-time vehicle driving information. To the present end, the first controller 20 includes the torque command generator 21 that is configured to determine a driver's request torque from the real-time vehicle driving information and is configured to determine, generates, and outputs a command based on the determined driver's request torque, that is, a motor torque command (request torque command).

Furthermore, the first controller 20 further includes the virtual effect producing controller 22 that selects a virtual mode according to a current vehicle driving state in the virtual jet propulsion mode from the real-time vehicle driving information and generates a mode shifting effect torque for producing a mode transition (shift) section effect during mode shifting to the currently selected virtual mode.

Furthermore, the first controller 20 includes a final torque command generator 23 that corrects the motor torque command input from the torque command generator 21 using the mode shifting effect torque input from the virtual effect producing controller 22 and generates and outputs the corrected torque command as a final motor torque command (referred to hereinafter as a 'final torque command').

Here, the torque command generator 21 may be configured to determine the driver's request torque and the motor torque command by further using virtual variable information in addition to the real-time vehicle driving information collected while the electric vehicle is running. The virtual variable information may include virtual mode information selected according to a current vehicle driving state.

In an ON state of the virtual jet propulsion mode, the virtual effect producing controller 22 of the first controller 20 is configured to determine and selects a virtual mode according to the current vehicle driving state based on the vehicle driving information, and the torque command generator 21 receives information related to the virtual mode determined by the virtual effect producing controller 22, that is, virtual mode information.

Furthermore, the torque command generator 21 of the first controller 20 is configured to determine a motor torque command corresponding to the input virtual mode information and a driver's real-time driving input value. Here, the driving input value may include an accelerator position sensor value, and the driving input value may include an accelerator position sensor value (APS value, %) detected by the accelerator position detector of the driving information detector 12.

Furthermore, the torque command generator 21 transmits the determined motor torque command (torque command before correction) to the final torque command generator 23. The torque command generator 21 may be a vehicle control unit (VCU) or a part thereof that generates a motor torque command based on vehicle driving information in a typical electric vehicle.

In the exemplary embodiment of the present disclosure, the virtual effect producing controller 22 of the first controller 20 is a new component that is configured to determine the mode shifting effect torque which is a correction torque for producing the mode transition (shifting) section effect during the mode shifting and generates and outputs the result as a command, and may be provided as a part of a vehicle control unit (VCU) or provided as a control element separated from the vehicle control unit.

The final torque command generator 23 corrects the motor torque command input from the torque command generator 21 to the mode shifting effect torque, which is the correction torque input from the virtual effect producing controller 22, and outputs the corrected motor torque command as the final torque command.

The second controller 30 is a controller that receives the final torque command (motor torque command after correction) output from the final torque command generator 23 of the first controller 20 and is configured to control an operation of the drive device 41.

In the exemplary embodiment of the present disclosure, the drive device 41 is a motor that drives a vehicle, and the second controller 30 may be a known motor control unit (MCU) that drives a motor through an inverter in a typical electric vehicle and is configured to control an operation of the motor.

In the present way, the second controller 30 is configured to control the operation of the motor, which is the drive device 41, according to the final torque command of the first controller 20, and at the same time, the first controller 20 is configured to perform control for implementing a visual effect and a sound effect of the virtual jet propulsion mode.

In the exemplary embodiment of the present disclosure, the torque and rotation force output by the motor, which is the drive device 41, are transmitted to the drive wheel 43 after being reduced by a speed reducer 42 as shown in FIG. 3. Here, in a case where the motor is controlled according to the final torque command of the controller 20 by the second controller 30, a motor torque configured for inducing vehicle vibration and vehicle behavior that mimic the operating state and driving feeling of a jet engine while the vehicle is running may be output.

As described above, the first controller 20 and the second controller 30 are controllers involved in a control process for realizing and producing the virtual effects that mimic the driving feeling and operating state of the jet engine in the vehicle and a running control process of the vehicle.

In the description of the exemplary embodiment of the present disclosure, a configuration in which the first controller and the second controller are separately provided for the control process has been described, but the control process for producing the virtual effects in the vehicle according to an exemplary embodiment of the present disclosure may also be performed by a single integrated control element instead of the plurality of controllers.

The single integrated control element may be collectively referred to as a controller, and the control process of the present disclosure may be performed by the controller. In the following description, the 'controller' may collectively refer to the first controller 20 and the second controller 30.

Furthermore, the apparatus for implementing the virtual jet propulsion mode according to an exemplary embodiment of the present disclosure may further include an interface 11 provided to be used by a driver to select and input one of on or off operations of the virtual jet propulsion mode.

The interface 11 is a component configured for outputting electrical signals according to the on or off operations in the vehicle, through which the driver can selectively manipulate the on or off operations in the vehicle, and may include, for example, an operating device such as a button or switch provided in the vehicle, an input device of an Audio, Video and Navigation (AVN) system, or a touchscreen.

The interface 11 may be connected to the first controller 20, and may also be connected to the virtual effect producing controller 22 to be described later in the first controller 20. Accordingly, in a case where there is an on or off operation by the driver through the interface 11, an on or off signal from the interface 11 may be transmitted to the virtual effect producing controller 22 of the first controller 20. As a result, the virtual effect producing controller 22 of the first controller 20 may recognize a driver's on or off operation state in the virtual jet propulsion mode.

In the exemplary embodiment of the present disclosure, the virtual jet propulsion mode for generating and realizing a virtual jet engine driving feeling during vehicle running may be executed only when the driver inputs the ON state in the virtual jet propulsion mode through the interface 11.

Furthermore, in a case where the interface 11 is an input device mounted in the vehicle, a mobile device (not shown in FIG. 1) may be used as the interface 11, instead of the input device of the vehicle. In the instant case, the driver may also turn on or off the virtual jet propulsion mode through the mobile device.

The mobile device may be communicatively connected to an in-vehicle device, for example, the first controller 20, and for the present purpose, an input/output communication interface for communication connection between the mobile device and the first controller 20 may be used.

Furthermore, the apparatus for realizing the virtual jet propulsion mode according to the exemplary embodiment of the present disclosure may include a sound system 50 that produces a sound effect of a virtual jet engine driving feeling and a display device 54 such as a cluster for producing a visual effect of the virtual jet engine driving feeling, which are mounted in the vehicle.

The sound system 50 and the display device 54 may be connected to the virtual effect producing controller 22 of the first controller 20, and may be provided so that their operations are controlled according to control signals output by the virtual effect producing controller 22 of the first controller 20.

Here, the virtual effect producing controller 22 is configured to perform cooperative control for the operations of the sound system 50 and display device 54 while exchanging necessary information with the torque command generator 21 to produce and provide the virtual auditory and visual effects.

The display device 54 may be a cluster mounted in front of the driver's seat of the vehicle, and may display virtual variable information determined corresponding to a current driving state of the vehicle, for example, a currently selected virtual mode, to the driver during vehicle running.

Furthermore, the display device 54 may display and show, as the virtual variable information, a virtual jet engine speed determined corresponding to the current vehicle driving state to the driver. Such virtual variable information may be referred to as information representing a current operating state of the virtual jet propulsion mode.

In a case where the virtual effect producing controller 22 of the first controller 20 outputs a control signal for displaying the virtual jet engine speed and the virtual mode to the display device 54, the display device 54 is operated to display the virtual jet engine speed and the virtual mode according to the output control signal.

Furthermore, the sound system 50 may include a sound generator 51, an amplifier 52, and a speaker 53 that are operated according to a control signal output by the virtual effect producing controller 22 of the first controller 20, that is, a sound control signal.

In the exemplary embodiment of the present disclosure, the virtual effect producing controller 22 of the first controller 20 may be configured to generate and output a sound control signal corresponding to a virtual jet engine speed. In the instant case, the sound control signal may be a control signal for outputting a virtual sound having a volume corresponding to the virtual jet engine speed.

In the present way, in a case where the sound control signal which is output from the virtual effect producing controller 22 is input to the sound generator 51 of the sound system 50, the sound generator 51 is operated according to the input sound control signal to generate and output a virtual sound signal according to the sound control signal.

The virtual sound signal output from the sound generator 51 is amplified by the amplifier 52 of the sound system 50, and is then converted into a virtual running sound through the speaker 53 of the sound system 50 which is mounted in the vehicle to be output.

As described above, in the exemplary embodiment of the present disclosure, the virtual variable information includes a virtual jet engine speed and a virtual mode, and such virtual variable information is determined based on real-time vehicle driving information which is actual driving state variable information in the virtual effect producing controller 22 of the first controller 20.

The virtual jet engine speed in the virtual variable information may be obtained from a rotation speed (drive system speed) of an actual vehicle drive system detected by the speed detector of the driving information detector 12.

Furthermore, the virtual jet engine speed may be determined as a value corresponding to a currently selected virtual mode, and may be a virtual speed determined from a real-time drive system speed which is actual driving state variable information in the virtual effect producing controller 22 of the first controller 20.

In the exemplary embodiment of the present disclosure, the virtual jet engine speed may be expressed in Mach Number as in a real jet engine. However, in an electric vehicle, in a case where the virtual jet engine speed is expressed in Mach Number, a driver may feel an unreal feeling of driving. Accordingly, the virtual jet engine speed may be expressed in a rotation speed unit of RPM.

In the exemplary embodiment of the present disclosure, virtual mode information, which is another virtual variable information, may be additionally used to obtain a virtual jet engine speed from a drive system speed which is an actual driving state variable in an electric vehicle.

Here, the virtual jet engine speed may be determined as a value associated with an actual motor speed (a rotation speed of the motor). That is, the virtual jet engine speed may be determined as a variable multiple of the drive system speed detected by the speed detector of the driving information detector 12, in which the drive system speed may be the motor speed.

In the present way, the virtual jet engine speed may be determined as a variable multiple of the motor speed by multiplying the motor speed by a variable coefficient. Here, the value of the variable coefficient multiplied by the motor speed to determine the virtual jet engine speed may be a value determined according to the currently selected virtual mode.

The variable coefficient may be a value predetermined for each virtual mode in the virtual effect producing controller 22 of the first controller 20. That is, the virtual jet engine speed may be determined from a real-time drive system speed detected by the speed detector of the driving information detector 12 and a variable coefficient corresponding to the currently selected virtual mode.

The virtual jet engine speed may be determined as a value obtained by multiplying the real-time motor speed detected by the speed detector of the driving information detector 12 by the variable coefficient corresponding to the currently selected virtual mode.

As a result, the virtual jet engine speed determined as described above may be displayed through the display device 54, and additionally, post-processing correction such as filtering or rate limiting is performed on the result of the multiplication of the real-time drive system speed and the variable coefficient. Then, the corrected virtual jet engine speed may be displayed through the display device 54.

Among the virtual variable information, the virtual mode may be determined by a mode shifting schedule map preset from real-time vehicle driving information, that is, actual driving state variables such as a vehicle speed and an accelerator position sensor value (APS value), or a motor speed and a motor torque, representing a current vehicle driving state, in the virtual effect producing controller 22 of the first controller 20.

Here, the vehicle speed may be an actual vehicle speed detected by the speed detector (wheel speed sensor) of the driving information detector 12, but may be determined as a value proportional to the motor speed by multiplying a real-time motor speed which is an actual driving state variable detected by the speed detector (resolver) of the driving information detector 12 by a preset virtual final reduction gear ratio.

In the instant case, the mode shifting schedule map may be a map in which actual driving state variables such as vehicle speed and accelerator position sensor values, or a motor speed and a motor torque are used as input variables and virtual modes corresponding to a combination of the input variables are set in advance.

In the mode shifting schedule map, a threshold value for performing a higher mode shifting and a lower mode shifting using the actual driving state variable information as an input value may be set.

Figure 4:
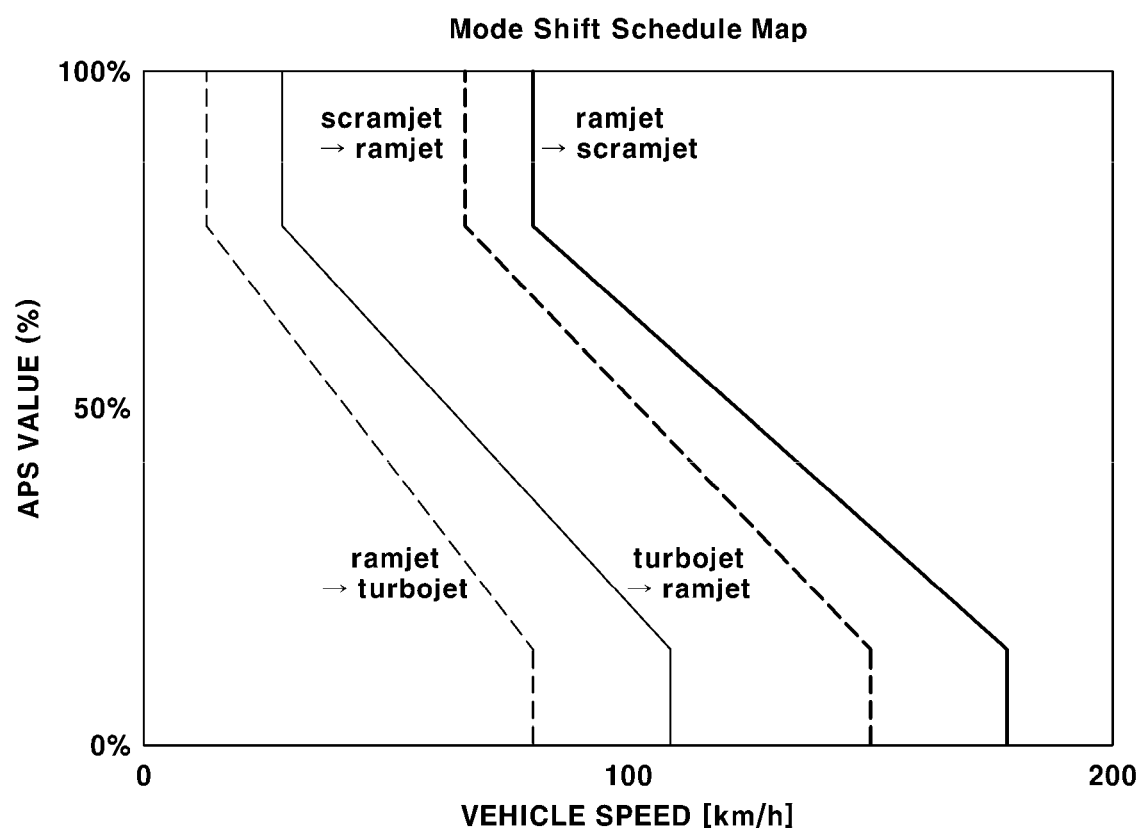
FIG. 4 is a diagram illustrating a mode shifting schedule map which is usable for selecting and changing a virtual mode in a process of implementing a virtual jet propulsion mode according to various exemplary embodiments of the present disclosure.

FIG. 4 is a diagram illustrating a mode shifting schedule map which is usable for selecting and changing a virtual mode in a process of implementing a virtual jet propulsion mode according to various exemplary embodiments of the present disclosure.

Throughout the description, it should be noted that change, shifting, and transition are used interchangeably with respect to modes.

The shifting between virtual modes included in the virtual jet propulsion mode provided as a virtual driving mode in the exemplary embodiment of the present disclosure may be performed according to the mode shifting schedule map illustrated in FIG. 4.

In the mode shifting schedule map shown in FIG. 4, one of the plurality of virtual modes included in the virtual jet propulsion mode may be selected according to a current accelerator position sensor value (APS value, %) and a vehicle speed (km/hr) as real-time vehicle driving information (actual driving state variable information).

As shown in the figure, the virtual jet propulsion mode may be divided into three virtual modes, i.e., a turbojet mode, a ramjet mode, and a scramjet mode, in which a criterion for the higher mode shifting may be set as a function of a motor driving direction operating point.

A criterion for the lower mode shifting may be set similarly to the criterion for the higher mode shifting, but a threshold line for the lower mode shifting may be set to be located at a relatively lower value than a threshold line for the higher mode shifting with reference to a speed axis (vehicle speed axis) to prevent unnecessary mode shifts and busy shifts.

That is, in comparing the threshold values of the accelerator position sensor values (APS values) under the same vehicle speed condition, the threshold value for the lower mode shifting may be set to a value lower than the threshold value for the higher mode shifting. Furthermore, in comparing the threshold values of the vehicle speed under the same accelerator position sensor value condition, the threshold value for the lower mode shifting may be set to a value lower than the threshold value for the higher mode shifting.

As described above, the mode shifting schedule map includes mode shifting threshold lines for setting and defining threshold values for mode shiftings with respect to the accelerator position sensor value (APS value) and the vehicle speed, in which the mode shifting threshold lines include a higher mode shifting threshold line for the higher mode shifting and a lower mode shifting threshold line for the lower mode shifting according to the accelerator position sensor value and the vehicle speed.

Referring to the example of FIG. 4, a higher mode may be selected as the accelerator position sensor value (APS value) and the corresponding torque in the motor driving direction (driving torque) increase, in which the ramjet mode may be a higher speed mode than the turbojet mode, and the scramjet mode may be a higher speed mode than the ramjet mode.

In the following description, among the turbojet mode which is a lowest speed mode and the ramjet mode which is a relatively high speed mode, the turbojet mode is defined as a lower-stage mode compared to the ramjet mode.

Furthermore, among the scramjet mode which is a highest speed mode and the ramjet mode which is a relatively low speed mode, the scramjet mode is defined as a higher-stage mode compared to the ramjet mode.

Similarly, the ramjet mode is defined as a higher-stage mode compared to the turbojet mode, and the ramjet mode is defined as a lower-stage mode compared to the scramjet mode. Furthermore, the ramjet mode may be referred to as an intermediate-stage mode between the turbojet mode and the scramjet mode.

As a result, changing a current mode to a higher-stage mode may be defined as a higher mode shifting, and changing the current mode to a lower-stage mode may be defined as a lower mode shifting.

Referring to the example of FIG. 4, the ramjet mode which is a higher-stage mode may be selected at an accelerator position sensor value greater than an accelerator position sensor value at which the turbojet mode is performed (under the same vehicle speed condition), and the scramjet mode which is a higher-stage mode may be selected at an accelerator position sensor value greater than the accelerator position sensor value at which the ramjet mode is performed (under the same vehicle speed condition).

Furthermore, in a case where the vehicle is accelerating, during the higher mode shifting and the lower mode shifting, the mode shifting schedule is set so that the higher mode shifting is performed at a higher vehicle speed, as the acceleration position sensor value (APS value) and the corresponding torque in the motor driving direction (driving torque) become smaller.

Here, as described above, the higher mode shifting means a change from a lower-stage mode to a higher-stage mode, that is, a change from the turbojet mode to the ramjet mode, and a change from the ramjet mode to the scramjet mode.

Conversely, the lower mode shifting means a change from a higher-stage mode to a lower-stage mode, that is, a change from the scramjet mode to the ramjet mode, and a change from the ramjet mode to the turbojet mode.

In the exemplary embodiment of the present disclosure, as may be seen from the map of FIG. 4, at a higher vehicle load (under the same vehicle speed condition), the map of a higher-stage maintenance tendency (higher mode shifting tendency) is used, which is different from a case of a general vehicle where a map of a lower-stage maintenance tendency is used at a higher load.

Figure 5:
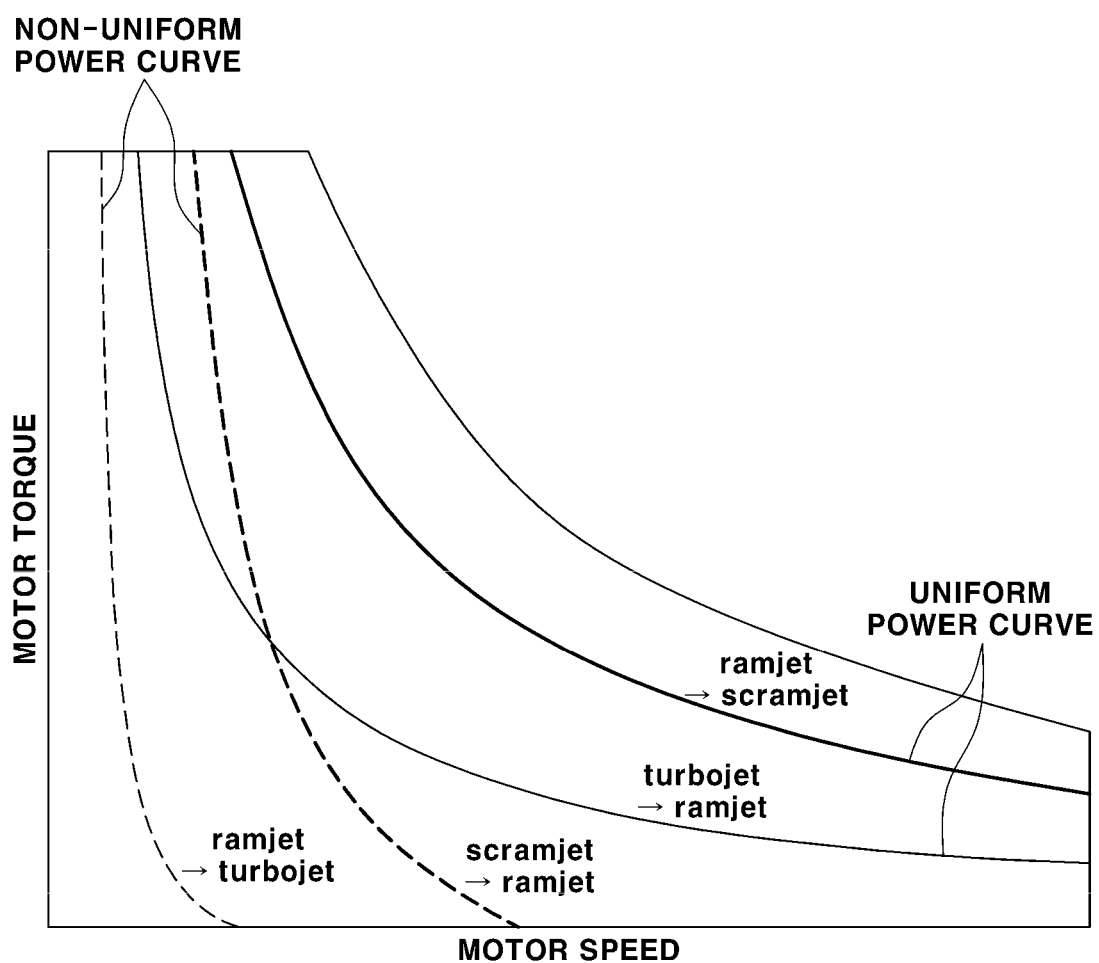
FIG. 5 is a diagram illustrating uniform power curve data which is usable for selecting and changing a virtual mode in a process of implementing a virtual jet propulsion mode according to various exemplary embodiments of the present disclosure.

FIG. 5 is a diagram illustrating uniform power curve data which is usable for selecting and changing a virtual mode in a process of implementing a virtual jet propulsion mode according to various exemplary embodiments of the present disclosure. In the exemplary embodiment of the present disclosure, for shifting between virtual modes, the uniform power curve data as shown in FIG. 5 may be used instead of the mode shifting schedule map as shown in FIG. 4.

That is, the shifting between the virtual modes included in the virtual jet propulsion mode, provided as the virtual driving modes, may be performed according to the uniform power curve data as shown in FIG. 5.

In the uniform power curve data as shown in FIG. 5, one of the plurality of virtual modes included in the virtual jet propulsion mode may be selected according to a torque ('motor torque') and a rotation speed ('motor speed') of the motor which is the drive device 41 that drives the vehicle, which are real-time vehicle driving information. Here, the motor torque may be a motor torque command which is a request torque command necessary for vehicle running.

In a case where the selection and determination of the virtual mode is performed by the virtual effect producing controller 22 of the first controller 20, the virtual effect producing controller 22 may receive the motor torque command determined by the torque command generator 21 and use the received command for selection and determination of the virtual mode.

As described above, the virtual jet propulsion mode may be divided into three virtual modes, that is, the turbojet mode, the ramjet mode, and the scramjet mode, and a criterion for the higher mode shifting may be set as a function (uniform power curve) of a motor driving direction output.

In the uniform power curve data of FIG. 5, the uniform power curve becomes a threshold line that defines a threshold value for the higher mode shifting based on a current motor torque and a current motor speed. That is, the uniform power curve is used as the criterion for the higher mode shifting.

In a case where the uniform power curve data of FIG. 5 is used, a criterion for the lower mode shifting may be set similarly to the criterion for the higher mode shifting, but a threshold line for the lower mode shifting may be set to be located at a relatively lower value than a threshold value for the higher mode shifting with reference to a speed axis to prevent busy shifts.

That is, in comparing the threshold values of the motor torques under the same motor speed condition, the threshold value for the higher mode shifting (torque values indicated by the "uniform power curve" and the "non-uniform power curve" in FIG. 5) may be set to a value lower than the threshold value for the lower mode shifting.

Furthermore, in comparing the threshold values of the motor speeds (speed values indicated by the "uniform power curve" and the "non-uniform power curve" in FIG. 5) under the same motor torque condition, the threshold value for the lower mode shifting may be set to a value lower than the threshold value for the higher mode shifting.

In the present way, the uniform power curve data includes the uniform power curves as shown in FIG. 5 as mode shifting threshold lines for setting and defining threshold values for mode shifts with respect to motor torques and motor speeds, and the mode shifting threshold lines include a higher mode shifting threshold line for a higher mode shifting and a lower mode shifting threshold line for a lower mode shifting, according to the motor torques and motor speeds.

Referring to the example of FIG. 5, a higher mode may be selected as the greater than the motor torque under the same motor speed condition, in which the ramjet mode which is a higher speed mode may be selected at a motor torque value greater than a motor torque at which the turbojet mode is performed, and the scramjet mode which is a higher speed mode may be selected at a motor torque greater than the motor torque at which the ramjet mode is performed.

Furthermore, it may be seen that the uniform power curve data is set so that, during the higher mode shifting and the lower mode shifting in vehicle acceleration, the higher mode shifting is performed at a higher motor speed the smaller the motor torque.

Furthermore, to prevent excessive shifting due to frequent repetition of pulse-type acceleration/deceleration, only in the case of the lower mode shifting, map-type data for operating points, that is, a mode shifting schedule map as in FIG. 4, may be set separately.

Furthermore, at an operating point outside a driving direction motor operating point map, it is considered that the motor torque is basically in a state of 0, and determination of the necessity of mode shifting and mode selection may be performed. Alternatively, a regenerative direction operating point map including a threshold line for a lower mode shifting may be added to be used for the lower mode shifting.

Figure 6:
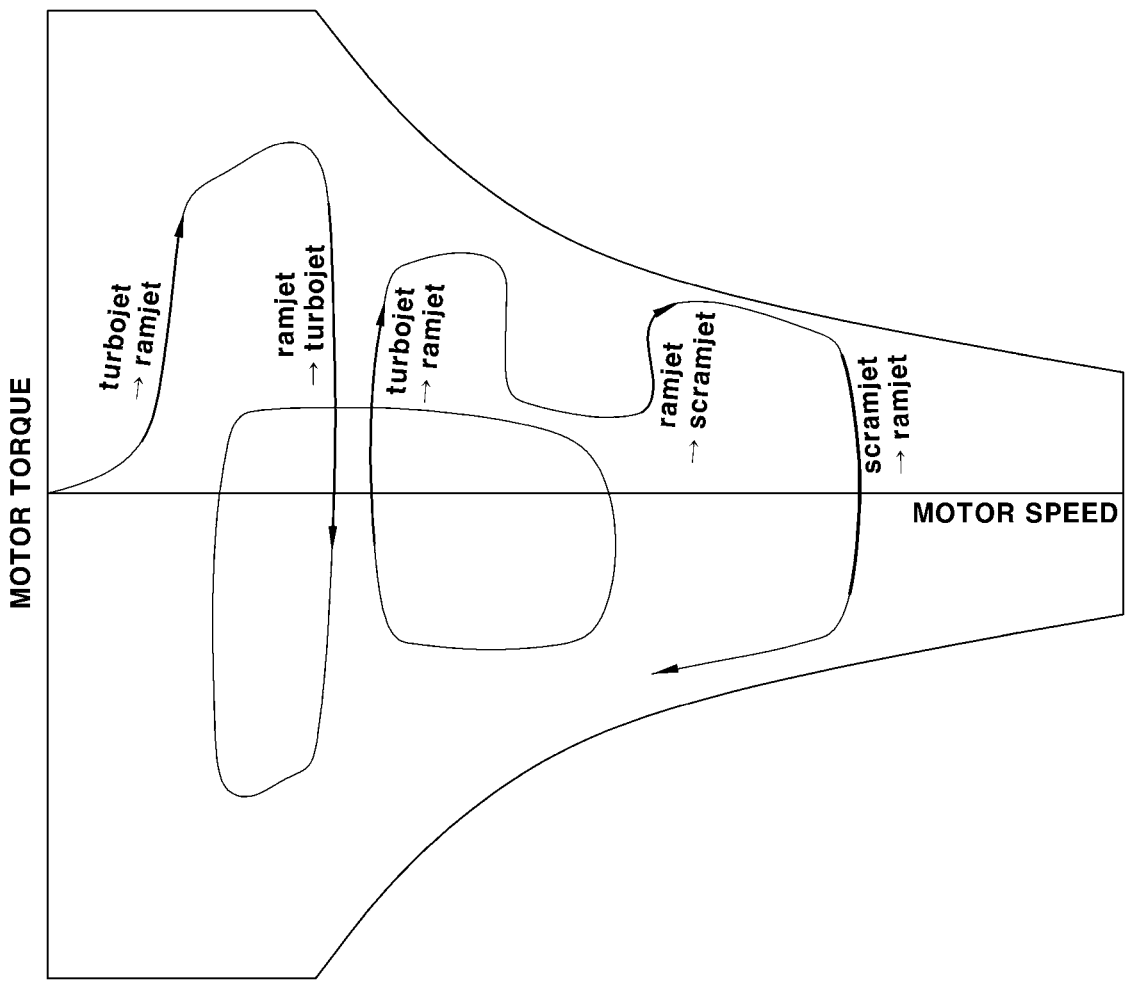
FIG. 6 is a diagram showing another example for selecting and changing a virtual mode in a process of implementing a virtual jet propulsion mode according to various exemplary embodiments of the present disclosure.
Figure 7:
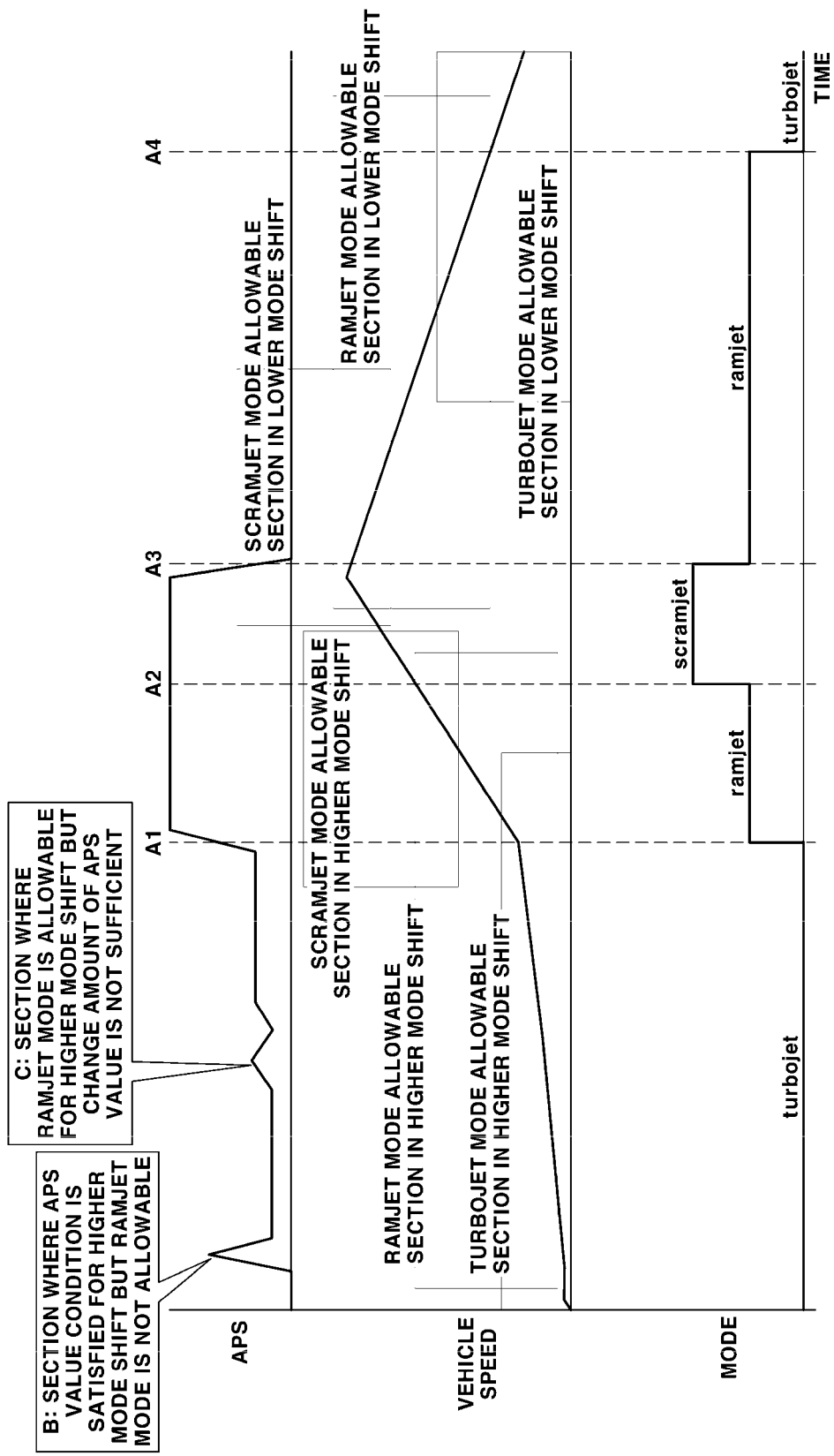
FIG. 7 is a diagram illustrating a change state between virtual modes according to FIG. 6.

FIG. 6 is a diagram showing another example for selecting and changing a virtual mode in a process of implementing a virtual jet propulsion mode according to various exemplary embodiments of the present disclosure. FIG. 7 is a diagram illustrating a change state between virtual modes according to FIG. 6.

In FIG. 7, a turbojet mode allowable section in a higher mode shifting, a ramjet mode allowable section in a higher mode shifting, a scramjet mode allowable section in a higher mode shifting, a scramjet mode allowable section in a lower mode shifting, a ramjet mode allowable section in a lower mode shifting, and a turbojet mode allowable section in a lower mode shifting, which will be described later, may be set in advance based on vehicle speeds.

In the examples shown in FIG. 6 and FIG. 7, a change amount of a predetermined driving state variable or a change rate of the driving state variable, or both of the change amount and the change rate of the driving state variable, in the vehicle driving information, may be used as criteria for the higher mode shifting.

In the instant case, in a case where predetermined one or two of the change amount and the change rate of the driving state variable, which are the criteria for determining the higher mode shifting and selecting the mode, exceed each preset threshold value, the higher mode shifting may be performed.

Here, the driving state variable for determining the higher mode shifting and selecting the mode may be an accelerator position sensor value (APS value) or a request torque (command value) necessary for vehicle running. That is, in a case where predetermined one or two of the change amount and the change rate of the accelerator position sensor value (APS value) or predetermined one or two of the change amount and the change rate of the request toque exceed each preset threshold value, the higher mode shifting may be performed.

Here, the request torque may be a driver's request torque value determined as a value corresponding to the accelerator position sensor value, as the vehicle driving information. Here, a conventional method of determining a driver's request torque corresponding to an accelerator position sensor value in an electric vehicle may be used.

Although the case of the higher mode shifting has been described above, in the case of the lower mode shifting, similarly, the lower mode shifting may be performed in a case where the predetermined one or two of the change amount and the change rate of the driving state variable exceed each preset threshold. Here, the driving state variable may be an accelerator position sensor value or a request torque, similar to the higher mode shifting.

As described above, the higher mode shifting means a change from the turbojet mode to the ramjet mode, and a change from the ramjet mode to the scramjet mode. Conversely, the lower mode shifting means a change from the scramjet mode to the ramjet mode, and a change from the ramjet mode to the turbojet mode.

In the exemplary embodiment of the present disclosure, the threshold value may be a variable value according to a predetermined driving state variable among vehicle driving information. The driving state variable that determines the threshold value may be a predetermined one among a motor torque, an accelerator position sensor value, a drive system speed, and a vehicle speed.

As described above, in the exemplary embodiment of the present disclosure, the threshold value may be determined and varied as a value corresponding to a predetermined one from among the motor torque, the accelerator position sensor value, the drive system speed, and the vehicle speed, in which the motor torque may be a motor torque command (request torque command), and the drive system speed may be a motor speed or a wheel speed detected by each sensor of the driving information detector.

As described above, the vehicle speed may be additionally used in addition to the accelerator position sensor value or the request torque as the driving state variable for determining the higher mode shifting or the lower mode shifting and selecting the mode.

Furthermore, the driving state variable for determining the higher mode shifting and the lower mode shifting and selecting the mode may further include the vehicle speed, and the criterion for determining the higher mode shifting and selecting the mode may further include a preset allowable vehicle speed section for each mode.

Here, the allowable vehicle speed section for each mode may include a turbojet mode allowable section in a higher mode shifting, a ramjet mode allowable section in a higher mode shifting, and a scramjet mode allowable section in a higher mode shifting, each of which is set as a predetermined vehicle speed section.

The turbojet mode allowable section in the higher mode shifting and the ramjet mode allowable section in the higher mode shifting may overlap each other in at least a part of the vehicle speed section, and the ramjet mode allowable section in the higher mode shifting and the scramjet mode allowable section in the higher mode shifting may overlap each other in at least a part of the vehicle speed section.

In comparing vehicle speed sections that do not overlap each other in the turbojet mode allowable section in the higher mode shifting, the ramjet mode allowable section in the higher mode shifting, and the scramjet mode allowable section in the higher mode shifting, a vehicle speed section that does not overlap other jet mode allowable sections, in the scramjet mode allowable section in the higher mode shifting, is set as the highest vehicle speed section.

Furthermore, a vehicle speed section that does not overlap other jet mode allowable sections, in the turbojet mode allowable section in the higher mode shifting, is set as the lowest vehicle speed section, and the middle of the non-overlapping highest vehicle speed section and lowest vehicle speed section is set as a vehicle speed section that does not overlap other jet mode allowable sections, in the ramjet mode allowable section in the higher mode shifting.

Here, a section between the vehicle speed section that overlaps the turbojet mode allowable section in the higher mode shifting, in the ramjet mode allowable section in the higher mode shifting, and the vehicle speed section that overlap the scramjet mode allowable section in the higher mode shifting, in the ramjet mode allowable section in the higher mode shifting, becomes a vehicle speed section which is independently set as an exclusive ramjet mode allowable section that does not overlap other jet mode allowable sections, in the ramjet mode allowable section in the higher mode shifting.

Furthermore, in a case where the turbojet mode allowable section in the higher mode shifting overlaps the ramjet mode allowable section in the higher mode shifting at a part of the vehicle speed section, the vehicle speed section in which the turbojet mode allowable section in the higher mode shifting and the ramjet mode allowable section in the higher mode shifting overlap each other is set as a vehicle speed section lower than the vehicle speed section which is independently set as an exclusive ramjet mode allowable section in the higher mode shifting (that is, the vehicle speed section that does not overlap other jet mode allowable sections in the ramjet mode allowable section in the higher mode shift).

Furthermore, in a case where the ramjet mode allowable section in the higher mode shifting overlaps the scramjet mode allowable section in the higher mode shifting at a part of the vehicle speed section, the vehicle speed section in which the ramjet mode allowable section in the higher mode shifting and the scramjet mode allowable section in the higher mode shifting overlap each other is set as a vehicle speed section higher than the vehicle speed section which is independently set as an exclusive ramjet mode allowable section in the higher mode shifting (that is, the vehicle speed section that does not overlap other jet mode allowable sections).

Furthermore, the allowable vehicle speed section for each mode may further include a scramjet mode allowable section in a lower mode shifting, a ramjet mode allowable section in a lower mode shifting, and a turbojet mode allowable section in a lower mode shifting, each of which is set as a predetermined vehicle speed section.

Similarly, the scramjet mode allowable section in the lower mode shifting and the ramjet mode allowable section in the lower mode shifting may overlap each other at a part of the vehicle speed section, and the ramjet mode allowable section in the lower mode shifting and the turbojet mode allowable section in the lower mode shifting may overlap each other at a part of the vehicle speed section.

In comparing vehicle speed sections that do not overlap each other in the scramjet mode allowable section in the lower mode shifting, the ramjet mode allowable section in the lower mode shifting, and the turbojet mode allowable section in the lower mode shifting, a vehicle speed section that does not overlap other jet mode allowable sections, in the scramjet mode allowable section in the lower mode shifting, is set as the highest vehicle speed section.

Furthermore, a vehicle speed section that does not overlap other jet mode allowable sections, in the turbojet mode allowable section in the lower mode shifting, is set as the lowest vehicle speed section, and the middle of the highest non-overlapping vehicle speed section and lowest vehicle speed section is set as a vehicle speed section that does not overlap other jet mode allowable sections, in the ramjet mode allowable sections in the lower mode shifting.

Furthermore, in a case where the scramjet mode allowable section in the lower mode shifting overlaps the ramjet mode allowable section in the lower mode shifting at a part of the vehicle speed section, the vehicle speed section in which the scramjet mode allowable section in the lower mode shifting and the ramjet mode allowable section in the lower mode shifting overlap each other is set as a vehicle speed section higher than the vehicle speed section which is independently set as an exclusive ramjet mode allowable section in the lower mode shifting (that is, the vehicle speed section that does not overlap other jet mode allowable sections).

Furthermore, in a case where the ramjet mode allowable section in the lower mode shifting overlaps the turbojet mode allowable section in the lower mode shifting at a part of the vehicle speed section, the vehicle speed section in which the ramjet mode allowable section in the lower mode shifting and the turbojet mode allowable section in the lower mode shifting overlap each other is set as a vehicle speed section lower than the vehicle speed section which is independently set as an exclusive ramjet mode allowable section in the lower mode shifting (that is, the vehicle speed section that does not overlap other jet mode allowable sections).

Furthermore, in the exemplary embodiment of the present disclosure, in a case where a current vehicle speed is within a vehicle speed section which is independently set as an exclusive turbojet mode allowable section in the higher mode shifting, regardless of the accelerator position sensor value or the request torque value, if a current mode is the turbojet mode, the turbojet mode is maintained without mode shifting.

However, in the current turbojet mode, in a case where the current vehicle speed is within the vehicle speed section which is independently set as an exclusive ramjet mode allowable section in the higher mode shifting, regardless of the accelerator position sensor value or the request torque value, the ramjet mode is selected, and the turbojet mode transitions to the ramjet mode.

Similarly, in the current ramjet mode, in a case where the current vehicle speed is within a vehicle speed section which is independently set as an exclusive scramjet mode allowable section in the higher mode shifting, regardless of the accelerator position sensor value or the request torque value, the scramjet mode is selected, and the ramjet mode transitions to the scramjet mode.

Furthermore, in a case where the current vehicle speed is within a vehicle speed section which is independently set as an exclusive scramjet mode allowable section in the lower mode shifting, regardless of the accelerator position sensor value or the request torque value, if a current mode is the scramjet mode, the scramjet mode is maintained.

However, in the current scramjet mode, in a case where the current vehicle speed is within a vehicle speed section which is independently set as an exclusive ramjet mode allowable section in the lower mode shifting, regardless of the accelerator position sensor value or the request torque value, the ramjet mode is selected, and the scramjet mode transitions to the ramjet mode.

Similarly, in the current ramjet mode, in a case where the current vehicle speed is within a vehicle speed section which is independently set as an exclusive turbojet mode allowable section in the lower mode shifting, regardless of the accelerator position sensor value or the request torque value, the turbojet mode is selected, and the ramjet mode transitions to the turbojet mode.

Furthermore, in a state where the current vehicle speed is a vehicle speed where the turbojet mode allowable section in the higher mode shifting and the ramjet mode allowable section in the higher mode shifting overlap each other, or in a state where the current vehicle speed is in a vehicle speed section where the ramjet mode allowable section in the higher mode shifting and the scramjet mode allowable section in the higher mode shifting overlap each other, if predetermined one or two of the change amount and the change rate of the accelerator position sensor value or the request torque exceed each threshold value, the mode shifting may be selectively performed according to an immediately previously selected virtual mode.

That is, in a case where the current vehicle speed is in the vehicle speed section in which the turbojet mode allowable section in the higher mode shifting and the ramjet mode allowable section in the higher mode shifting overlap each other, and the predetermined one or two of the change amount and the change rate of the accelerator position sensor value or the request torque exceed each threshold, if the immediately previously selected virtual mode is the turbojet mode, the mode transitions to the ramjet mode.

In a case where the current vehicle speed is in the vehicle speed section in which the turbojet mode allowance section in the higher mode shifting and the ramjet mode allowance section in the higher mode shifting overlap each other, and the predetermined one or two of the change amount and the change rate of the accelerator position sensor value or the request torque exceed each threshold, if the immediately previously selected virtual mode is the ramjet mode, the ramjet mode is maintained.

Similarly, in a case where the current vehicle speed is in a vehicle speed section in which the ramjet mode allowable section in the higher mode shifting and the scramjet mode allowable section in the higher mode shifting high overlap each other, and predetermined one or two of the change amount and the change rate of the accelerator pedal input value or the request torque exceed the threshold value, if the immediately previously selected virtual mode is the ramjet mode, the mode transitions to the scramjet mode, and if the immediately selected virtual mode is the scramjet mode, the scramjet mode is maintained.

The above description is similarly applied to the lower mode shifting. In a case where the current vehicle speed is in a vehicle speed section in which the scramjet mode allowable section in the lower mode shifting and the ramjet mode allowable section in the lower mode shifting high overlap each other, and predetermined one or two of the change amount and the change rate of the accelerator pedal input value or predetermined one or two of the change amount and the change rate of the request torque exceed each threshold value, if the immediately previously selected virtual mode is the scramjet mode, the mode transitions to the ramjet mode, and if the immediately selected virtual mode is the ramjet mode, the ramjet mode is maintained.

Similarly, in a case where the current vehicle speed is in a vehicle speed section in which the ramjet mode allowable section in the lower mode shifting and the turbojet mode allowable section in the lower mode shifting overlap each other, and predetermined one or two of the change amount and the change rate of the accelerator pedal input value or the request torque exceed each threshold value, if the immediately previously selected virtual mode is the ramjet mode, the mode transitions to the turbojet mode, and if the immediately selected virtual mode is the turbojet mode, the turbojet mode is maintained.

Referring to 'B' of FIG. 7, since an accelerator position sensor value (APS value) condition for changing a lower-stage mode to a higher-stage mode is satisfied, but a current vehicle speed is not within the ramjet mode allowable section at the time of satisfaction and is independently only in the turbojet mode allowable section, the turbojet mode is maintained.

Furthermore, in 'C' of FIG. 7, since the current vehicle speed is in a vehicle speed section in which the turbojet mode allowable section in the higher mode shifting and the ramjet mode allowable section in the higher mode shifting overlap each other, the current turbojet mode may transition to the ramjet mode in considering only the vehicle speed condition, but since the change amount of the accelerator position sensor value is an insufficient value that does not exceed the threshold value, the transition to the ramjet mode is not performed.

On the other hand, at point 'A1', since the change amount and change rate of the accelerator position sensor value exceed each threshold value, and the current vehicle speed is within a vehicle speed section in which the turbojet mode allowable section in the higher mode shifting and the ramjet mode allowable section in the higher mode shifting overlap each other, the current turbojet mode transitions to the ramjet mode which is a higher-stage mode among the modes in the overlapping vehicle speed section.

Similarly, at point 'A3', since the change amount and change rate of the accelerator position sensor value exceed each threshold value, and the current vehicle speed is within a vehicle speed section in which the scramjet mode allowable section in the lower mode shifting and the ramjet mode allowable section in the lower mode shifting overlap each other, the current scramjet mode transitions to the ramjet mode which is a lower-stage mode among the modes in the overlapping vehicle speed section.

Furthermore, at point 'A2', in a state where the immediately previously selected virtual mode is the ramjet mode, the current vehicle speed enters the scramjet mode allowable section in the higher mode shifting that does not overlap the vehicle speed sections of other jet mode allowable sections, so that the higher mode shifting to the scramjet mode which is a higher-stage mode is performed.

Figure 8:
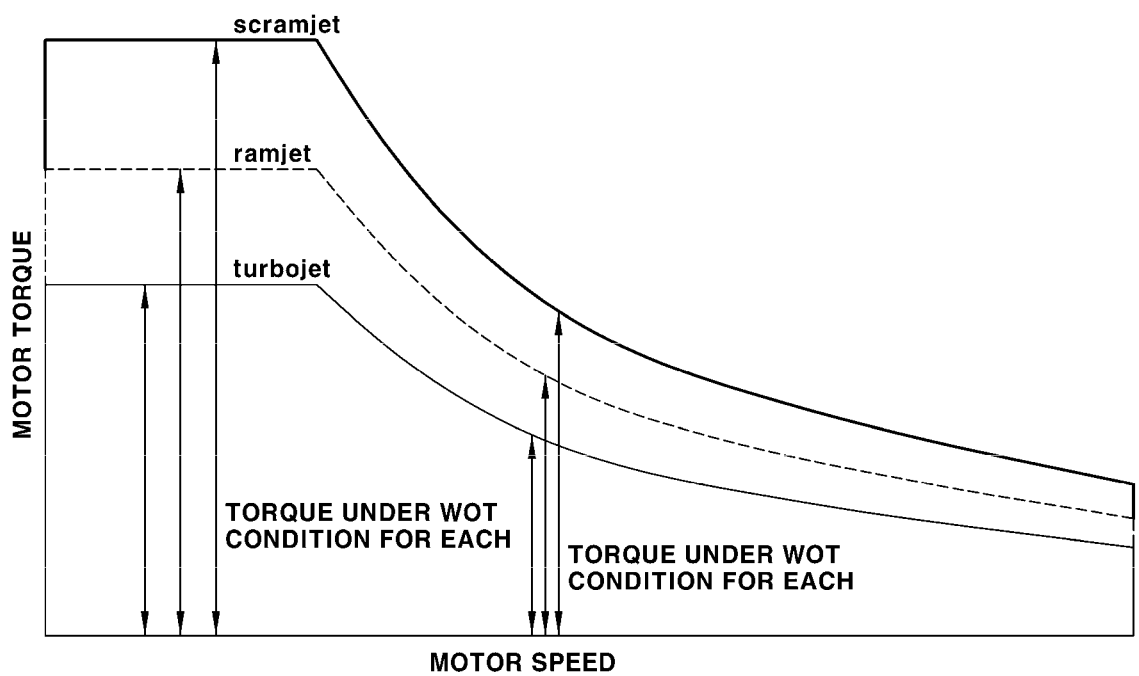
FIG. 8 and FIG. 9 are diagrams illustrating torque (T)-speed (N) maps that are usable in a virtual jet propulsion mode according to various exemplary embodiments of the present disclosure.
Figure 9:
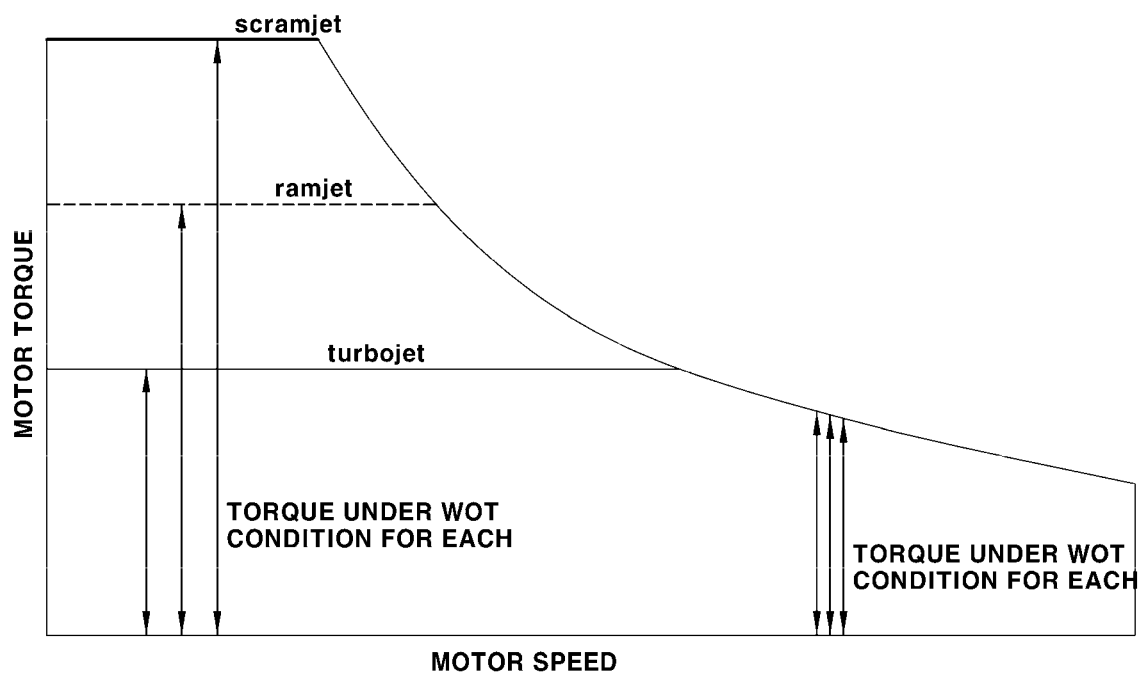

On the other hand, FIG. 8 and FIG. 9 are diagrams illustrating torque (T)-speed (N) maps that are usable in the virtual jet propulsion mode according to the exemplary embodiment of the present disclosure, which show torque-speed curves of motors set for respective virtual modes.

FIG. 8 and FIG. 9 are diagrams illustrating different examples of the torque (T)-speed (N) map, both of which show driving torque maps configured for determining a motor torque (command value) for each motor speed based on the accelerator position sensor value (APS value).

In the exemplary embodiment of the present disclosure, in the torque-speed map to be set for the virtual jet propulsion mode, the horizontal axis represents the rotation speed (RPM) of the motor which is a drive device configured for driving the vehicle, that is, the motor speed, and the vertical axis represents the motor torque.

In the exemplary embodiment of the present disclosure, the torque-speed maps of the virtual modes to be selected during operation of the virtual jet propulsion mode, that is, the turbojet mode, the ramjet mode, and the scramjet mode, may be set and used as shown in FIG. 8 and FIG. 9.

Furthermore, the maximum torque under a wide open throttle (WOT) condition for each speed (RPM) in each virtual mode may be set according to a torque-speed curve in a map shown in a graph form. The maximum torque for each speed of each virtual mode represented by the shown torque-speed curve is a torque under a full load condition where the accelerator is fully (100%) depressed, that is, the wide open throttle (WOT) condition.

Referring to the torque-speed curve graph for each virtual mode, the maximum torque is kept constant up to a specific speed (set speed), but when the speed exceeds the specific speed, the torque-speed map is set so that the maximum torque decreases as the speed increases.

In the exemplary embodiment of the present disclosure, the controller is configured to generate a motor torque command configured for driving the motor with the maximum torque of the torque-speed curve corresponding to a currently selected virtual mode under the WOT condition, making it possible to enter a high torque region with a quick response in a low speed section.

The example shown in FIG. 8 is an example in which the maximum torques under the WOT condition for respective virtual modes are set to different values in the entire speed section, in which each maximum torque (torque under the WOT condition) is set to include a reduced scale compared to other virtual modes.

Referring to FIG. 8, the scale of the maximum torque in the ramjet mode is reduced compared to the scramjet mode, and the scale of the maximum torque in the turbojet mode is reduced compared to the ramjet mode.

Since the maximum torque is set so that the scale is reduced, the shape of the torque-speed curve is set so that the maximum torque is kept constant up to a specific speed in the same manner, but is set, when the speed exceeds the specific speed, so that the maximum torque decreases as the speed increases. However, the maximum torques that decrease in a region where the speed exceeds a specific speed show different values for respective virtual modes.

Unlike the above example, the example shown in FIG. 9 is an example in which only the maximum torques in the low-speed section kept constant for respective virtual modes are set to be different from each other, in which the maximum torque that decreases as the speed increases is set to the same value regardless of the virtual modes.

Various aspects of the present disclosure are directed to providing the method of implementing the plurality of virtual modes such as the turbojet mode, the ramjet mode, and the scramjet mode in the virtual jet propulsion mode that mimics an operating state of a jet engine, in which a specific method of determining a motor torque command according to an accelerator position sensor value using a torque-speed map is not different from a typical method of determining a motor torque command according to an accelerator position sensor value with reference to a torque-speed map in an electric vehicle.

That is, the method of determining the motor torque command according to the accelerator position sensor value with reference to the torque-speed map or the method of using the maximum torque of the torque-speed map as a motor torque limit value to determine the request torque based on the accelerator position sensor value and determine the motor torque command according to the determined request torque is not different from a conventional method of determining the motor torque command according to the accelerator position sensor value with reference to the torque-speed map in the electric vehicle.

As a simple example, in a case where the maximum torque indicated by the torque-speed curve for each virtual mode in FIG. 8 and FIG. 9 is a torque value under the WOT condition in which the accelerator position sensor value is 100%, and the motor torque command is determined as a value proportional to the accelerator position sensor value, the motor torque corresponding to a current motor speed may be determined from the torque-speed map using the maximum torque value per speed (RPM).

Furthermore, in the case of the example shown in FIG. 8, in the entire section of the motor speed, and in the case of the example shown in FIG. 9, in a low-speed section where the motor speed is equal to or lower than a specific speed, the maximum torque is set to a larger value in a higher-stage mode in the virtual jet propulsion mode.

That is, under the same accelerator position sensor value condition and motor speed condition, including the WOT condition, the maximum torque (limit torque) of the ramjet mode is set to be greater than that of the turbojet mode, and the maximum torque (limit torque) of the scramjet mode is set to be greater than that of the ramjet mode.

Accordingly, under the same accelerator position sensor value condition and motor speed condition, an actual motor torque command determined based on the maximum torque is also determined as a larger value in the ramjet mode compared to the turbojet mode, and a larger value in the scramjet mode compared to the ramjet mode.

As described above, in the exemplary embodiment of the present disclosure, in a case where the higher mode shifting is performed, the maximum torque increases, which is different from a case where the maximum torque decreases in a higher gear transmission during gear transmission.

However, in the exemplary embodiment of the present disclosure, although the virtual jet propulsion mode is implemented, the method of determining, from current accelerator position sensor value and motor speed, a motor torque command corresponding to the current accelerator position sensor value and motor speed using the torque-speed map as shown in FIG. 8 and FIG. 9 for each virtual mode in the virtual jet propulsion mode is similar to a method of determining a motor torque corresponding to current accelerator position sensor value and motor speed from a torque-speed map in an electric vehicle.

Figure 10:
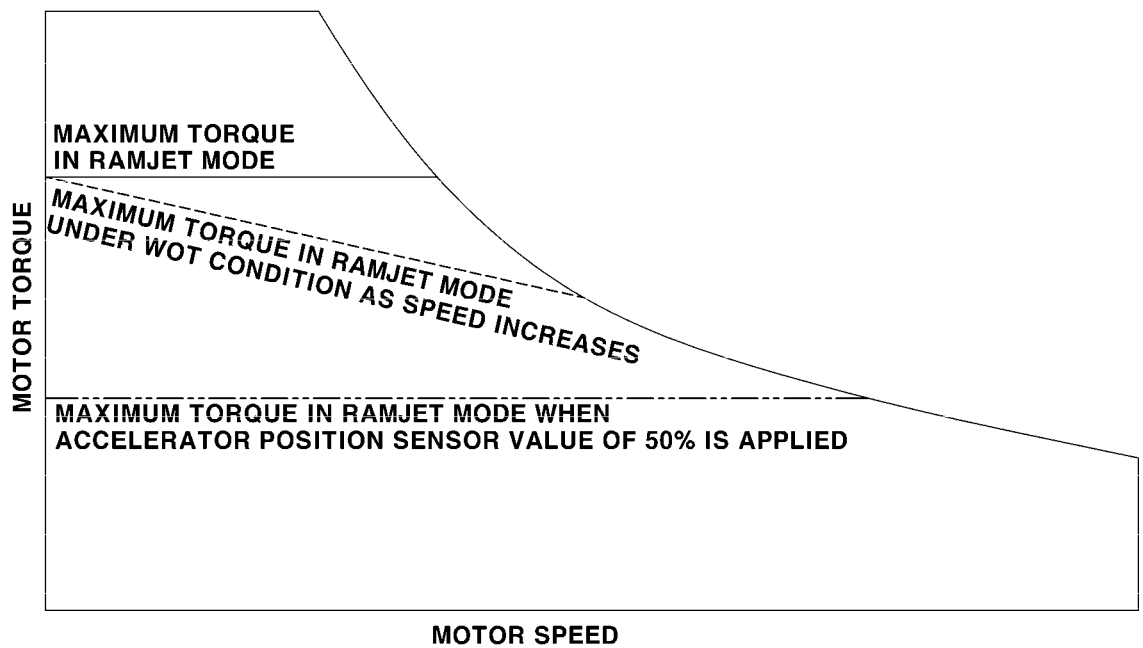
FIG. 10 is a diagram showing another example of a torque-speed map which is usable in a virtual jet propulsion mode according to various exemplary embodiments of the present disclosure.

On the other hand, FIG. 10 is a diagram showing another example of a torque-speed map usable in a virtual jet propulsion mode according to various exemplary embodiments of the present disclosure, in which the maximum torque (limit torque) is set to decrease as the speed increases even in a low-speed section.

That is, in the examples shown in FIG. 8 and FIG. 9, the maximum torque is set to a constant torque value in the low-speed section where the motor speed is equal to or lower than the specific speed (set speed), but in the example shown in FIG. 10, as the motor speed increases, the maximum torque under the WOT condition (limit torque) is set to decrease at a predetermined slope.

Here, in the high-speed section except for the low-speed section, the maximum torque may be set to decrease in a form similar to the examples shown in FIG. 8 and FIG. 9 as the motor speed increases, and the maximum torque may be set so that the torque-speed curve in the high-speed section becomes a curve rather than a straight line.

Furthermore, the controller may perform setting to determine a decrease slope of the maximum torque that decreases in the low-speed section as a value corresponding to the driver's accelerator position sensor value (APS value). Thus, in a case where the maximum torque value that decreases at the slope in the low-speed section is determined, and in a case where a current motor speed is a speed corresponding to the low-speed section, the motor torque command corresponding to the driver's accelerator position sensor value may be determined using the maximum torque that decreases at the slope.

In an example in which the maximum torque is set to decrease in the low-speed section as in the example of FIG. 10, the maximum torque reduction in the low-speed section may be applied only within a range where the accelerator position sensor value (APS value) exceeds a preset value.

For example, in a state where the preset value is 50%, in a case where a current accelerator position sensor value is equal to or less than 50%, a slope of 0 may be applied, and accordingly, the maximum torque may be set to a constant torque value even if the motor speed increases up to a specific speed (preset speed).

On the other hand, only within a range where the accelerator position sensor value exceeds the preset value and is equal to or less than WOT, the maximum torque may be determined as a value that decreases at the slope as the speed increases.

In a state where the accelerator position sensor value exceeds the preset value and is equal to or less than WOT at the same time, in a low-speed section where the motor speed is equal to or less than the specific speed, since the maximum torque is determined as a value that decreases at the slope, the motor torque command determined as a value corresponding to the accelerator position sensor value using the maximum torque as a limit torque may be determined as a value that decreases as the motor speed increases in the low-speed section, in a similar way to the maximum torque.

Furthermore, as described above, the maximum torque reduction in the low-speed section may be set to be applied only to a part of the plurality of virtual modes included in the virtual jet propulsion mode.

For example, in the turbojet mode and the ramjet mode, the maximum torque may be determined as a value that decreases at the slope as the motor speed increases in the low-speed section, but in the scramjet mode, the maximum torque may be set to a constant torque value in the low-speed section, as shown in the examples of FIG. 8 and FIG. 9.

Figure 11:
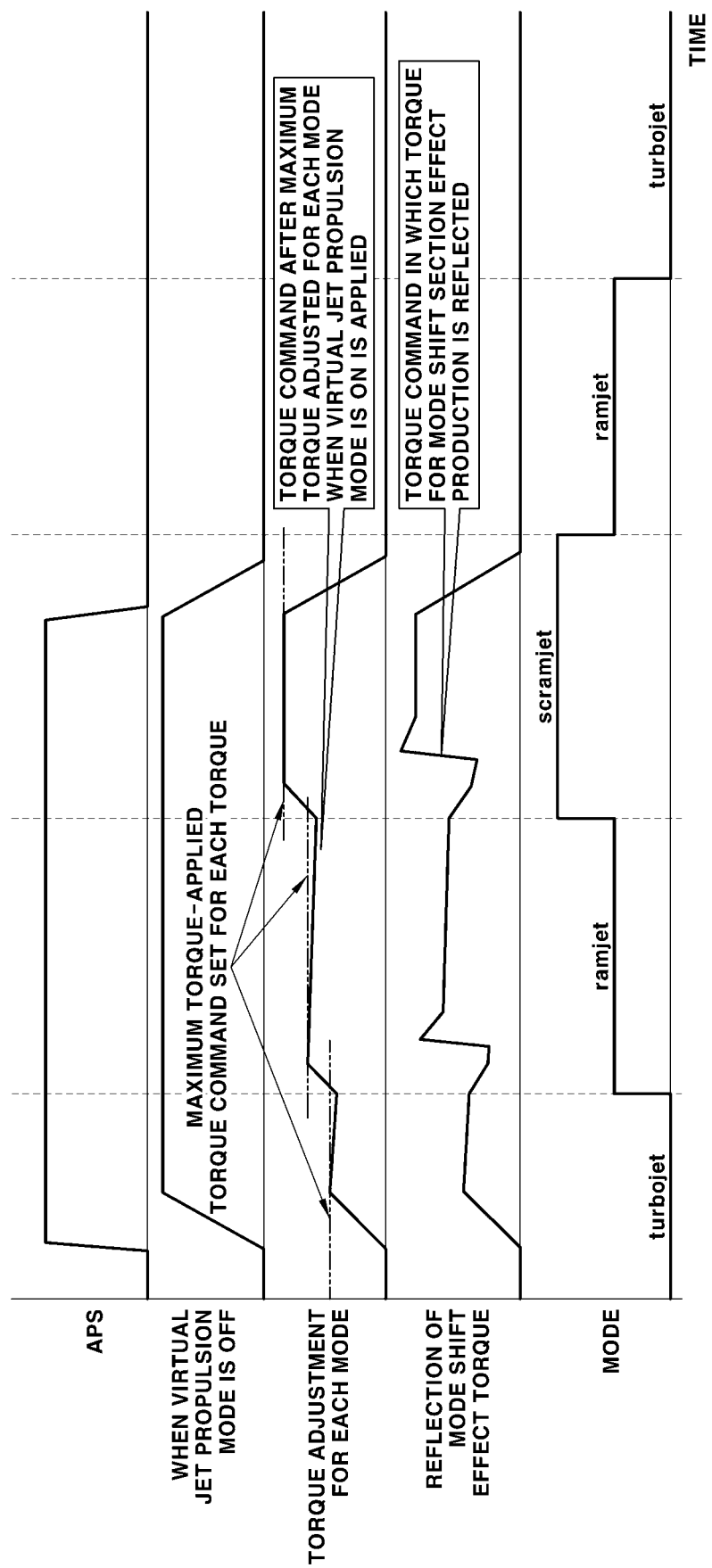
FIG. 11 is a diagram illustrating a state in which mode shifting is performed in performing a virtual jet propulsion mode according to various exemplary embodiments of the present disclosure.

FIG. 11 is a diagram illustrating a state in which mode shifting is performed in performing a virtual jet propulsion mode according to various exemplary embodiments of the present disclosure, which shows an example in which the maximum torque is set to decrease at a specific slope in a low-speed section as in the example of FIG. 10.

First, in a case where a driver depresses an accelerator to maintain a certain amount of pressure state, a motor torque command may be determined as a predetermined torque value when the virtual jet propulsion mode is turned off.

On the other hand, when the virtual jet propulsion mode is turned on, the virtual effect producing controller 22 of the first controller 20 selects one virtual mode in the virtual jet propulsion mode according to a current vehicle driving state, and transmits information on the selected virtual mode, that is, virtual mode information, to the torque command generator 21.

According to the example shown in FIG. 11, a higher mode shifting in the virtual jet propulsion mode is performed so that the low-stage turbojet mode is changed to the intermediate-stage ramjet mode and the intermediate-stage ramjet mode is changed to the high-stage scramjet mode according to a real-time vehicle driving state.

Accordingly, in a case where the driver tips-out the accelerator and the accelerator is turned off, a lower mode shifting in the virtual jet propulsion mode is performed so that the high-stage scramjet mode is changed to the low-stage turbojet mode through the intermediate-stage ramjet mode.

When the virtual jet propulsion mode is turned on, in the turbojet mode and the ramjet mode, as shown in FIG. 11, control is performed to reduce the maximum torque at a predetermined slope in a low-speed section. Here, the controller is configured to determine a motor torque command corresponding to a current accelerator position sensor value (APS value) using the torque-speed map as shown in FIG. 10.

Here, whenever the virtual mode is changed during the higher mode shifting, the mode shifting is performed through a transition section, and the motor torque command is adjusted to a value corresponding to the selected virtual mode even though the same accelerator position sensor value is maintained.

Referring to the motor torque command adjusted for each mode, the motor torque command may be determined as a larger value in the intermediate-stage ramjet mode compared to the low-stage turbojet mode, and may be determined as a larger value in the high-stage scramjet mode compared to the intermediate-stage ramjet mode.

In the present way, in the mode transition section during the mode shifting, the motor torque command corresponding to the immediately previously selected virtual mode is changed to the motor torque command corresponding to the currently selected virtual mode at the predetermined slope.

Furthermore, since the torque-speed map shown in FIG. 10 is applied during the turbojet mode and the ramjet mode, the motor torque command decreases at a predetermined slope even though the same accelerator position sensor value is maintained. However, in the case of the scramjet mode, since the same accelerator position sensor value is maintained, the motor torque command is determined as a constant torque value.

The torque adjusted for each virtual mode as described above may be referred to as a motor torque command generated by the torque command generator 21 of the first controller 20. That is, the adjusted torque for each virtual mode shown in FIG. 11 is a motor torque command determined by the torque command generator 21 of the first controller 20 in a case where the virtual jet propulsion mode is turned on, which is a motor torque command determined as a value corresponding to a current virtual mode selected according to vehicle driving information.

Furthermore, in a state where the virtual jet propulsion mode is turned on, the virtual effect producing controller of the first controller 20 generates and outputs a correction torque for producing the effect of the mode transition (change) section in a case where there is a request for the higher mode shifting, that is, a mode shifting effect torque.

In the mode transition section during the mode shifting, a transition section starting torque value of a final torque command after the mode shifting effect torque is applied may be a motor torque command value of the immediately previously selected virtual mode, and a transition section ending torque value may be a motor torque command value of the currently selected virtual mode.

Furthermore, the final torque command after the mode shifting effect torque is applied to the motor torque command may be set to include a value that increases after temporarily decreasing, and additionally, the final torque command may be set to include an artificial overshoot torque shape when the torque decreases and then increases for return to produce a dramatic effect in the mode transition section.

Accordingly, the final torque command generator 23 of the first controller 20 is configured to determine the final torque command using the motor torque command (adjusted torque for each mode in FIG. 11) output from the torque command generator 21 and the mode shifting effect torque output from the virtual effect producing controller 22.

In the exemplary embodiment of the present disclosure, the mode shifting effect torque may be selectively applied, and when applied, the motor shifting effect torque is applied to the motor torque command only during the mode transition section to determine the final torque command.

As a result, in a case where the mode shifting effect torque for producing the mode transition section effect is applied to the motor torque command, the final torque command after the mode shifting effect torque is applied, as shown in FIG. 11, temporarily decreases from the torque value of the mode before change in the transition section (transition section starting torque value), increases to a torque value greater than the torque value of the mode after change, and then decreases to the torque value of the mode after change (transition section ending torque value) to show an overshoot torque shape and effect.

Furthermore, in the mode transition section, the range of increase or decrease of the final torque command after the mode shifting effect torque is applied may be varied in proportion to an accelerator position sensor value. That is, the larger the accelerator position sensor value, the smaller the mode transition effect, that is, the mode shifting effect torque, and the smaller the accelerator position sensor value, the larger the mode shifting effect torque.

Furthermore, the time of the mode transition section in which the mode shifting effect torque is applied and reflected in the final torque command, that is, the time during which the mode transition effect is generated may be varied in proportion to an accelerator position sensor value.

Furthermore, in the exemplary embodiment of the present disclosure, one or both of the increase/decrease range of the final torque command after the mode shifting effect torque is applied and the time of the mode transition section in which the mode shifting effect torque is applied may be varied in proportion to the accelerator position sensor value.

As described above, in the exemplary embodiment of the present disclosure, since a driver can feel as if a jet engine is operating in an electric vehicle and can feel as if a driving mode of a virtual jet propulsion mode changes according to a driving state of the vehicle, the driver can experience maximized driving fun and differentiated driving sensibility.

In the exemplary embodiment of the present disclosure, the example in which the virtual jet propulsion mode includes the turbojet mode, the ramjet mode, and the scramjet mode has been described, but the present disclosure is not limited thereto, and different virtual modes configured for providing different virtual effects may be added to the above-described turbojet mode, ramjet mode, and scramjet mode.

In the above description, the mode names of the turbojet mode, the ramjet mode, and the scramjet mode are intended to aid understanding of the present disclosure, and different terms may be used when applied to actual vehicles.

For example, each virtual mode provides driving sensibility of the virtual jet propulsion mode, but when applied to an actual vehicle, the turbojet mode may be referred to as an Eco Mode, the ramjet mode as a Normal Mode, and the scramjet mode as a Sport Mode, or simply referred to as a T-mode, an R-mode, or an S-mode.

According to the method of implementing the virtual jet propulsion mode of the electric vehicle according to an exemplary embodiment of the present disclosure, the driver can feel as if the jet engine is operating in the electric vehicle, and can feel as if the driving mode of the virtual jet propulsion mode changes according to the driving state of the vehicle, and thus, the driver can experience maximized driving fun and differentiated driving sensibility.

Furthermore, the driver can experience a virtual driving feeling that has not been felt through a conventional vehicle without changing the vehicle, and thus, it is possible to contribute to improving and differentiating marketability of the vehicle.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of implementing a virtual jet propulsion mode in an electric vehicle including a motor, the method comprising:
    collecting, by a controller of the vehicle, vehicle driving information while the vehicle is running in a state where the virtual jet propulsion mode including a plurality of virtual modes for simulating an operating state and a driving feeling of a jet engine is set in the controller of the vehicle;
    selecting, by the controller, a virtual mode corresponding to a current vehicle driving state from among the virtual modes of the virtual jet propulsion mode based on the collected vehicle driving information;
    determining, by the controller, a motor torque command corresponding to the collected vehicle driving information and a currently selected virtual mode; and
    controlling, by the controller, an operation of the motor that drives the vehicle according to the motor torque command.

2. The method of claim 1, wherein the plurality of virtual modes is a plurality of modes classified according to types of jet engines.

3. The method of claim 1, wherein the virtual jet propulsion mode, as the plurality of virtual modes, includes a turbojet mode, a ramjet mode, and a scramjet mode classified according to types of jet engines.

4. The method of claim 1, further including:
    displaying, by the controller, virtual variable information that represents a current operating state of the virtual jet propulsion mode through a display device of the vehicle during operation of the virtual jet propulsion mode during which the operation of the motor is controlled according to the determined motor torque command.

5. The method of claim 4, wherein the virtual variable information includes information on the currently selected virtual mode in the virtual jet propulsion mode.

6. The method of claim 5, wherein the virtual variable information further includes a virtual jet engine speed determined corresponding to the collected vehicle driving information and the currently selected virtual mode.

7. The method of claim 6, wherein the virtual jet engine speed is determined as a value obtained by multiplying a rotation speed of a vehicle drive system detected by a speed detector as the vehicle driving information by a variable coefficient corresponding to the currently selected virtual mode.

8. The method of claim 1, further including:
    outputting, by the controller, a virtual sound that mimics the operating state of the jet engine in the currently selected virtual mode through a sound system of the vehicle, during operation of the virtual jet propulsion mode during which the operation of the motor is controlled according to the determined motor torque command.

9. The method of claim 8, wherein the controller is further configured to determine a virtual jet engine speed corresponding to the collected vehicle driving information and the currently selected virtual mode, and to control an operation of the sound system to output the virtual sound corresponding to the virtual jet engine speed.

10. The method of claim 1, wherein in selecting the virtual mode, the controller is further configured to select, using a current vehicle speed and a current accelerator position sensor value as the vehicle driving information and using a map in which a threshold value for shifting between the plurality of virtual modes based on vehicle speeds and accelerator position sensor values is set, a current virtual mode corresponding to the current vehicle speed and the current accelerator position sensor value.

11. The method of claim 1, wherein in selecting the virtual mode, the controller is further configured to select, using data in which a threshold value for shifting between the plurality of virtual modes based on a current motor torque and a current motor speed as the vehicle driving information is set, a current virtual mode corresponding to the current motor torque and the current motor speed.

12. The method of claim 1, wherein in selecting the virtual mode, the controller is further configured to compare predetermined one or two of a change amount and a change rate of an accelerator position threshold value or predetermined one or two of a change amount and a change rate of a driver's request torque determined corresponding to the accelerator position threshold value, as the vehicle driving information, with a preset threshold value to determine shifting between the plurality of virtual modes.

13. The method of claim 12, wherein the controller is further configured to determine the shifting between the plurality of virtual modes using a current vehicle speed, as the vehicle driving information, in addition to the predetermined one or two of the change amount and the change rate of the accelerator threshold value or the predetermined one or two of the change amount and the change rate of the driver's request torque.

14. The method of claim 1, wherein the controller is further configured:
    to determine, in a response that there is a mode shifting request from the currently selected virtual mode and a previously selected virtual mode, a mode shifting effect torque for producing a mode transition section effect during mode shifting to the currently selected virtual mode;

to determine, in determining the motor torque command, a final motor torque command by applying the mode shifting effect torque to the motor torque command, during the mode shifting; and to control, in controlling the operation of the motor, the operation of the motor according to the final motor torque command after the mode shifting effect torque is applied, during the mode shifting.

15. The method of claim 14, wherein in a mode transition section during the mode shifting, a final torque command after the mode shifting effect torque is applied includes an overshoot torque shape in which a transition section starting torque value is a motor torque command value of the previously selected virtual mode, a transition section ending torque value is a motor torque command value of the currently selected virtual mode, and the final torque command decreases at the transition section starting torque value, increases to a torque value greater than the transition section ending torque value, and then decreases.

16. The method of claim 15, wherein in the mode transition section, predetermined one or both of an increase or decrease range of the final torque command after the mode shifting effect torque is applied and a time of the mode transition section during which the mode shifting effect torque is applied are variable in a size corresponding to an accelerator position sensor value.

17. The method of claim 1, wherein, in determining the motor torque command, the motor torque command is determined based on a current motor speed and a current accelerator position sensor value as the vehicle driving information, using a torque-speed map in which a maximum torque under a Wide Open Throttle (WOT) condition is set as a value according to a motor speed for each of the virtual modes.

18. The method of claim 17, wherein the virtual jet propulsion mode includes, as the plurality of virtual modes, a turbojet mode, a ramjet mode, and a scramjet mode classified according to types of jet engines, and wherein the torque-speed map is configured so that a maximum torque under the WOT condition in the turbojet mode is set as a value smaller than a maximum torque under the WOT condition in the ramjet mode, and the maximum torque under the WOT condition in the ramjet mode is set as a value smaller than a maximum torque under the WOT condition in the scramjet mode, in a low-speed section where the motor speed is equal to or lower than a preset speed.

19. The method of claim 18, wherein the torque-speed map is configured so that, in a section where the motor speed exceeds the preset speed, as the motor speed increases, the maximum torque value under the WOT condition in each virtual mode, according to the motor speed, decreases.

20. The method of claim 18, wherein the torque-speed map is configured so that, in at least a part of the plurality of virtual modes, as the maximum torque value under the WOT condition in the low-speed section decreases at a predetermined slope as the motor speed increases.

* * * * *